US009442920B2

(12) United States Patent
Nakamura et al.

(10) Patent No.: US 9,442,920 B2
(45) Date of Patent: Sep. 13, 2016

(54) SPEECH TRANSLATION SYSTEM, DICTIONARY SERVER, AND PROGRAM

(75) Inventors: Satoshi Nakamura, Koganei (JP); Eiichiro Sumita, Koganei (JP); Yutaka Ashikari, Koganei (JP); Noriyuki Kimura, Koganei (JP); Chiori Hori, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 1142 days.

(21) Appl. No.: 13/383,742

(22) PCT Filed: Mar. 3, 2010

(86) PCT No.: PCT/JP2010/053418
§ 371 (c)(1),
(2), (4) Date: Jan. 12, 2012

(87) PCT Pub. No.: WO2011/007595
PCT Pub. Date: Jan. 20, 2011

(65) Prior Publication Data
US 2012/0166176 A1 Jun. 28, 2012

(30) Foreign Application Priority Data

Jul. 16, 2009 (JP) ................................. 2009-167501

(51) Int. Cl.
*G06F 17/27* (2006.01)
*G10L 15/00* (2013.01)
*G06F 17/28* (2006.01)

(52) U.S. Cl.
CPC .................. *G06F 17/289* (2013.01)

(58) Field of Classification Search
CPC .... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881; G10L 15/00

USPC .................................... 704/1–10, 251, 257
See application file for complete search history.

(56) References Cited

U.S. PATENT DOCUMENTS 5,799,273 A * 8/1998 Mitchell ............... G06F 3/16
704/235
6,138,099 A * 10/2000 Lewis .................. G10L 15/22
704/235

(Continued)

FOREIGN PATENT DOCUMENTS

JP 64-088875 A 4/1989
JP 11-328179 A 11/1999

(Continued)

OTHER PUBLICATIONS

Office Action from Japanese Patent App. No. 2009-167501 (Jun. 27, 2013) with partial English language translation thereof.

(Continued)

*Primary Examiner* — Lamont Spooner
(74) *Attorney, Agent, or Firm* — Cermak Nakajima & McGowan LLP; Tomoko Nakajima

(57) ABSTRACT

A conventional speech recognition dictionary, translation dictionary and speech synthesis dictionary used in speech translation have inconsistencies. Inconsistency among dictionaries can be solved with a dictionary server including an all-language group dictionary storage unit capable of having stored therein, for two or more languages, two or more all-language term information pieces for speech recognition, translation and speech synthesis, an information-for-speech-recognition sending unit that acquires information for speech recognition including speech recognition information of a term for all languages, and sends the information to one or more speech recognition servers, an information-for-translation sending unit that acquires information for translation including the written form of the term for all languages, and sends the information to one or more translation servers, and an information-for-speech-synthesis sending unit that acquires information for speech synthesis including speech synthesis information of a term for all languages, and sends the information to one or more speech synthesis servers.

9 Claims, 20 Drawing Sheets

(56) References Cited

U.S. PATENT DOCUMENTS

| | | | | |
|---|---|---|---|---|
| 6,219,638 B1* | 4/2001 | Padmanabhan | G10L 15/22 | 379/100.08 |
| 6,324,513 B1* | 11/2001 | Nagai | G10L 15/22 | 704/256 |
| 6,345,245 B1* | 2/2002 | Sugiyama | G06F 17/2735 | 704/10 |
| 2002/0065652 A1* | 5/2002 | Kushida | G10L 15/30 | 704/231 |
| 2002/0138265 A1* | 9/2002 | Stevens | G10L 15/22 | 704/251 |
| 2003/0154070 A1* | 8/2003 | Tokuda | G09B 19/06 | 704/9 |
| 2003/0171911 A1* | 9/2003 | Fairweather | G06F 8/427 | 704/2 |
| 2005/0267738 A1* | 12/2005 | Wilkinson | G06F 17/275 | 704/9 |
| 2006/0106609 A1* | 5/2006 | Saito | G10L 13/00 | 704/260 |
| 2006/0129381 A1* | 6/2006 | Wakita | G06F 17/2872 | 704/9 |
| 2006/0149546 A1* | 7/2006 | Runge | G10L 15/01 | 704/246 |
| 2007/0038436 A1* | 2/2007 | Cristo | G06F 17/273 | 704/9 |
| 2007/0050191 A1* | 3/2007 | Weider | G06F 17/30864 | 704/275 |
| 2007/0233487 A1* | 10/2007 | Cohen | G10L 15/065 | 704/255 |
| 2008/0109228 A1* | 5/2008 | Park | G06F 17/2872 | 704/277 |
| 2008/0133228 A1* | 6/2008 | Rao | G10L 15/24 | 704/231 |
| 2008/0208563 A1* | 8/2008 | Sumita | G06F 17/28 | 704/2 |
| 2009/0024392 A1* | 1/2009 | Koshinaka | G10L 15/06 | 704/257 |
| 2009/0037122 A1* | 2/2009 | Engel | G06F 17/18 | 702/35 |
| 2009/0052635 A1* | 2/2009 | Jones | H04M 3/4936 | 379/88.02 |
| 2010/0217604 A1* | 8/2010 | Baldwin | G06Q 30/02 | 704/275 |
| 2011/0112827 A1* | 5/2011 | Kennewick | G10L 15/18 | 704/9 |

FOREIGN PATENT DOCUMENTS

| | | |
|---|---|---|
| JP | 2000-148176 A | 5/2000 |
| JP | 2000-194698 A | 7/2000 |
| JP | 2000-259632 A | 9/2000 |
| JP | 2002-123282 A | 4/2002 |
| JP | 2002-245038 A | 8/2002 |
| JP | 2003-295893 A | 10/2003 |
| JP | 2005-055607 A | 3/2005 |
| JP | 2005-202884 A | 7/2005 |
| JP | 2006-099296 A | 4/2006 |
| JP | 3142002 U | 5/2008 |
| JP | 2008-243080 A | 10/2008 |
| JP | 2009-139862 A | 6/2009 |
| JP | 2009-140503 A | 6/2009 |
| WO | WO2008/114708 A1 | 9/2008 |

OTHER PUBLICATIONS

International Search Report for PCT Patent App. No. PCT/JP2010/053418 (May 18, 2010).

Office Action from Korean Patent App. No. 10-2012-7001119 (Oct. 21, 2015) with English language translation.

* cited by examiner

FIG.11

| Term (dictionary entry) | Item | Language | | | | |
|---|---|---|---|---|---|---|
| | | Japanese | Korean | Chinese | English | -- |
| 大阪 | Written form | 大阪 | 오사카 | 大・阪 | Osaka | -- |
| | Reading | おおさか | Osaka | Daban | ousa:ka: | -- |
| | Acoustic model | ○-○-○ | ---- | ---- | ---- | -- |
| | Accent | 4 moras type 0 | ---- | Da4ban3 | óusaka | -- |
| | Others | ---- | ---- | \<tone\> fourth tone third tone | ---- | -- |
| 東京 | Written form | 東京 | 도쿄 | 東京 | Tokyo | -- |
| | Reading | とうきょう | ---- | Tongljingl | ---- | -- |
| | Acoustic model | ---- | ---- | ---- | ---- | -- |
| | Accent | ---- | ---- | ---- | tóukyo | -- |
| | Others | ---- | ---- | ---- | ---- | -- |
| ⋮ | ⋮ | ⋮ | ⋮ | ⋮ | ⋮ | ⋮ |

FIG.12

| Term (dictionary entry) | Item | Language | | | | |
|---|---|---|---|---|---|---|
| | | Japanese | Korean | Chinese | English | --- |
| 大阪 | Written form | 大阪 | 오사카 | 大・阪 | Osaka | --- |
| | Acoustic model | ○-○-○-○ | --- | --- | --- | --- |
| | Others | --- | --- | --- | --- | --- |
| 東京 | Written form | 東京 | 도쿄 | 東京 | Tokyo | --- |
| | Acoustic model | --- | --- | --- | --- | --- |
| | Others | --- | --- | --- | --- | --- |
| --- | --- | --- | --- | --- | --- | --- |

FIG.13

| Term (dictionary entry) | Item | Language | | | |
|---|---|---|---|---|---|
| | | Japanese | Korean | Chinese | English |
| 大阪 | Written form | 大阪 | 오사카 | 大阪 | Osaka |
| | Others | --- | --- | --- | --- |
| 東京 | Written form | 東京 | 도쿄 | 東京 | Tokyo |
| | Others | --- | --- | --- | --- |
| --- | | --- | --- | --- | --- |

FIG.14

| Term (dictionary entry) | Item | Language ||||
|---|---|---|---|---|---|
| | | Japanese | Korean | Chinese | English |
| 大阪 | Written form | 大阪 | 오사카 | 大・阪 | Osaka |
| | Reading | おおさか | Osaka | Daban | ousa:ka: |
| | Accent | 4 moras type 0 | --- | Da4ban3 | óusaka |
| | Others | --- | --- | \<tone\> fourth tone third tone | --- |
| 東京 | Written form | 東京 | 도쿄 | 東京 | Tokyo |
| | Reading | とうきょう | --- | Tongljingl | --- |
| | Accent | --- | --- | --- | tóukyo |
| | Others | --- | --- | --- | --- |
| --- | --- | --- | --- | --- | --- |

FIG.15

| | |
|---|---|
| <Source language> | Japanese |
| <Target language> | English |
| <Speech recognition server> | 186. 221. 1. 27 |
| <Translation server> | 225. 68. 21. 129 |
| <Speech synthesis server> | 56. 72. 128. 202 |
| <Other party's terminal> | 092-1445-1122 |
| <Own terminal> | 080-1111-2256 |
| ⋮ | |

FIG.16

| | |
|---|---|
| <Source language> | English |
| <Target language> | Japanese |
| <Speech recognition server> | 215. 76. 2. 11 |
| <Translation server> | 225. 68. 21. 129 |
| <Speech synthesis server> | 88. 125. 6. 218 |
| <Other party's terminal> | 080-1111-2256 |
| <Own terminal> | 090-1645-1122 |

FIG.17

| Term (dictionary entry) | Item | Language | | | | |
|---|---|---|---|---|---|---|
| | | Japanese | Korean | Chinese | English | |
| 大阪 | Written form | 大阪 | 오사카 | 大・阪 | Osaka | -- |
| | Reading | おおさか | Osaka | Daban | ousa:ka: | -- |
| | Acoustic model | (graph) | ---- | ---- | ---- | -- |
| | Accent | 4 moras type 0 | ---- | Da4ban3 | óusaka | -- |
| | Others | ---- | ---- | \<tone\> fourth tone third tone | ---- | -- |
| 東京 | Written form | 東京 | 도쿄 | 東京 | Tokyo | -- |
| | Reading | とうきょう | ---- | Tongljingl | ---- | -- |
| | Acoustic model | ---- | ---- | ---- | ---- | -- |
| | Accent | ---- | ---- | ---- | tóukyo | -- |
| | Others | ---- | ---- | ---- | ---- | -- |
| ⋮ | ⋮ | ⋮ | ⋮ | ⋮ | ⋮ | ⋮ |
| 名古屋 | Written form | 名古屋 | ---- | ---- | ---- | -- |
| | Reading | ---- | ---- | ---- | ---- | -- |
| | Acoustic model | ---- | ---- | ---- | ---- | -- |
| | ⋮ | ⋮ | ⋮ | ⋮ | ⋮ | ⋮ |

SPEECH TRANSLATION SYSTEM, DICTIONARY SERVER, AND PROGRAM

This application is a national phase entry under 35 U.S.C. §371 of PCT Patent Application No. PCT/JP2010/053418, filed on Mar. 3, 2010, which claims priority under 35 U.S.C. §119 to Japanese Patent Application No. 2009-167501, filed Jul. 16, 2009, both of which are incorporated by reference.

TECHNICAL FIELD

The present invention relates to a speech translation system or the like that performs speech translation.

BACKGROUND ART

In conventional speech translation systems, there are techniques for improving accuracy in each portion of processing, such as for improving speech recognition accuracy and for improving translation processing accuracy, (e.g., see Patent Document 1 and Patent Document 2).

[Patent Document 1] JP 2008-243080A (page 1 and FIG. 1, for example)

[Patent Document 2] JP 2009-140503A (page 1 and FIG. 1, for example)

DISCLOSURE OF INVENTION

Problem to be Solved by the Invention

However, conventionally, there have been cases in which speech translation cannot be performed due to inconsistency among a speech recognition dictionary, a translation dictionary and a speech synthesis dictionary that are used for performing speech translation processing. This inconsistency among dictionaries refers to, for example, a situation where information on a term that exists in one dictionary does not exist in another dictionary.

Means for Solving the Problems

A first aspect of the present invention is directed to a speech translation system including a dictionary server, one or more speech recognition servers, one or more translation servers, and one or more speech synthesis servers, wherein the dictionary server includes: an all-language group dictionary storage unit capable of having stored therein two or more pieces of all-language term information, each piece of all-language term information including term information with respect to each of two or more languages, each term information including a written form of a term that has one or more words, speech recognition information for performing speech recognition on the term, and speech synthesis information for performing speech synthesis on the term, the term information being associated with each other with respect to all of the two or more languages; an information-for-speech-recognition sending unit that acquires, from the all-language group dictionary storage unit, information for speech recognition that includes speech recognition information of the term with respect to all of the two or more languages, or at least two of the two or more languages, and sends the information for speech recognition to the one or more speech recognition servers; an information-for-translation sending unit that acquires, from the all-language group dictionary storage unit, information for translation that includes the written form of the term with respect to all of the two or more languages, or at least two of the two or more languages, and sends the information for translation to the one or more translation servers; and an information-for-speech-synthesis sending unit that acquires, from the all-language group dictionary storage unit, information for speech synthesis that includes speech synthesis information of the term with respect to all of the two or more languages, or at least two of the two or more languages, and sends the information for speech synthesis to the one or more speech synthesis servers, each speech recognition server includes: an information-for-speech-recognition storage unit capable of having stored therein information for speech recognition with respect to all of the two or more languages, or at least two of the two or more languages; an information-for-speech-recognition receiving unit that receives, from the dictionary server, information for speech recognition with respect to all of the two or more languages, or at least two of the two or more languages; an information-for-speech-recognition accumulation unit that accumulates the information for speech recognition received by the information-for-speech-recognition receiving unit in the information-for-speech-recognition storage unit; a speech information receiving unit that receives speech information that is information of speech input to a first terminal apparatus; a speech recognition unit that performs speech recognition on the speech information received by the speech information receiving unit by using information for speech recognition in the information-for-speech-recognition storage unit, and acquires a speech recognition result; and a speech recognition result sending unit that sends the speech recognition result, each translation server includes: an information-for-translation storage unit capable of having stored therein information for translation with respect to all of the two or more languages, or at least two of the two or more languages; an information-for-translation receiving unit that receives, from the dictionary server, information for sound translation with respect to all of the two or more languages, or at least two of the two or more languages; an information-for-translation accumulation unit that accumulates the information for translation received by the information-for-translation receiving unit in the information-for-translation storage unit; a speech recognition result receiving unit that receives the speech recognition result; a translation unit that translates the speech recognition result received by the speech recognition result receiving unit into a target language by using information for translation in the information-for-translation storage unit, and acquires a translation result; and a translation result sending unit that sends the translation result, each speech synthesis server includes: an information-for-speech-synthesis storage unit capable of having stored therein information for speech synthesis with respect to all of the two or more languages, or at least two of the two or more languages; an information-for-speech-synthesis receiving unit that receives, from the dictionary server, information for speech synthesis with respect to all of the two or more languages, or at least two of the two or more languages; an information-for-speech-synthesis accumulation unit that accumulates the information for speech synthesis received by the information-for-speech-synthesis receiving unit in the information-for-speech-synthesis storage unit; a translation result receiving unit that receives the translation result; a speech synthesis unit that performs speech synthesis on the translation result received by the translation result receiving unit by using information for speech synthesis in the information-for-speech-synthesis storage unit, and acquires a speech synthesis result; and a speech synthesis result sending unit that sends the speech synthesis result to a second terminal apparatus.

With such a configuration, it is possible to eliminate inconsistency among dictionaries used in speech translation.

A second aspect of the present invention is directed to, with respect to the first aspect of the present invention, the speech translation system speech translation system wherein the speech recognition unit of the speech recognition server includes: a speech recognition determination section that determines whether speech recognition processing performed on the speech information received by the speech information receiving unit has succeeded or failed; a speech recognition information sending instruction section that issues, to the dictionary server, an instruction to send speech recognition information in a case where the speech recognition determination section has determined that the speech recognition processing has failed; and a speech recognition section that performs speech recognition on the speech information received by the speech information receiving unit by using information for speech recognition in the information-for-speech-recognition storage unit, and acquires a speech recognition result, and also performs speech recognition by using speech recognition information that the information-for-speech-recognition receiving unit has received from the dictionary server in response to sending of the instruction, and acquires a speech recognition result, and the information-for-speech-recognition receiving unit receives the speech recognition information from the dictionary server in response to sending of the instruction.

With such a configuration, even if information of a term does not temporarily exist in the speech recognition dictionary in speech translation, it is possible to automatically acquire information of a necessary term at the time of speech recognition processing, and thus it is possible to execute speech recognition processing.

A third aspect of the present invention is directed to, with respect to the first aspect of the present invention, the speech translation system wherein the translation unit of the translation server includes: a translation determination section that determines whether translation processing performed on the speech recognition result received by the speech recognition result receiving unit has succeeded or failed; a translation information sending instruction section that issues, to the dictionary server, an instruction to send the written form of the term in the target language in a case where the translation determination section has determined that the translation processing has failed; and, a translation section that translates the speech recognition result received by the speech recognition result receiving unit into the target language by using information for translation in the information-for-translation storage unit, and acquires a translation result, and also translates the speech recognition result into the target language by using the written form of the term in the target language that the information-for-translation receiving unit has received from the dictionary server in response to sending of the instruction, and acquires a translation result, wherein the information-for-translation receiving unit receives the written form of the term in the target language from the dictionary server in response to sending of the instruction.

With such a configuration, even if information of a term does not temporarily exist in the translation dictionary in speech translation, it is possible to automatically acquire information of a necessary term at the time of translation processing, and thus it is possible to execute translation processing.

A fourth aspect of the present invention is directed to, with respect to the first aspect of the present invention, the speech translation system wherein the speech synthesis unit of the speech synthesis server includes: a speech synthesis determination section that determines whether speech synthesis processing performed on the translation result received by the translation result receiving unit has succeeded or failed; a speech synthesis information sending instruction section that issues, to the dictionary server, an instruction to send speech synthesis information in a case where the speech synthesis determination section has determined that the speech synthesis processing has failed; and a speech synthesis section that performs speech synthesis on the translation result received by the translation result receiving unit by using information for speech synthesis in the information-for-speech-synthesis storage unit, and acquires a speech synthesis result, and also performs speech synthesis on the translation result by using the speech synthesis information that the information-for-speech-synthesis receiving unit has received from the dictionary server in response to sending of the instruction, and acquires a speech synthesis result, and the information-for-speech-synthesis receiving unit receives the speech synthesis information from the dictionary server in response to sending of the instruction.

With such a configuration, even if information of a term does not temporarily exist in the speech synthesis dictionary in speech translation, it is possible to automatically acquire information of a necessary term at the time of speech synthesis processing, and thus it is possible to execute speech synthesis processing.

A fifth aspect of the present invention is directed to, with respect to any of the first to fourth aspects of the present invention, the speech translation system wherein the dictionary server further includes: a written form acquiring unit that acquires a written form of a term that does not exist in the all-language group dictionary storage unit from web pages on one or more web servers on the Internet; and a written form accumulation unit that accumulates the written form of the term acquired by the written form acquiring unit in the all-language group dictionary storage unit.

With such a configuration, it is possible to automatically supplement information in a multi-language common dictionary used for eliminating inconsistency among dictionaries used in speech translation.

Also, a sixth aspect of the present invention is directed to, with respect to the fifth aspect of the present invention, the speech translation system wherein the dictionary server further includes: an information accepting unit that accepts any information of the term information from one or more third terminal apparatuses; and an information accumulation unit that accumulates the information accepted by the information accepting unit in the all-language group dictionary storage unit in association with the written form of the term corresponding to the information accepted by the information accepting unit in a language corresponding to the information accepted by the information accepting unit.

With such a configuration, it is possible to supplement information in a multi-language common dictionary used for eliminating inconsistency among dictionaries used in speech translation.

Also, a seventh aspect of the present invention is directed to, with respect to the fifth or sixth aspect of the present invention, the speech translation system wherein the dictionary server further includes an output unit that outputs the all-language term information or part of the all-language term information, and in a case where the output unit outputs the all-language term information or part of the all-language term information, the output unit outputs the all-language term information or part of the all-language term information in visually different manners between a case where all predetermined information exists with respect to all of the two or more languages, and a case where part of the predetermined information is missing.

With such a configuration, it is possible to make it easier to supplement information in a multi-language common dictionary used for eliminating inconsistency among dictionaries used in speech translation.

Effect of the Invention

With the speech translation system of the present invention, it is possible to eliminate inconsistency among dictionaries used in speech translation.

BEST MODE FOR CARRYING OUT THE INVENTION

Hereinafter, embodiments of a speech translation system or the like will be described with reference to the attached drawings. Note that elements assigned the same reference numerals in the embodiments perform the same operations, and thus such elements may not be repetitively described.

Embodiment 1

In the present embodiment, a speech translation system will be described that is capable of eliminating inconsistency among dictionaries used in speech translation by using a dictionary server that includes an all-language group dictionary. Note that an all-language group dictionary is a dictionary that integrally manages information necessary for speech recognition, translation and speech synthesis. The all-language group dictionary is dictionary information that has stored therein two or more pieces of all-language term information. All-language term information is information that includes a single piece of term information for each of two or more languages that can be subjected to speech translation. Term information is information that includes speech recognition information necessary for speech recognition, translation information necessary for translation, and speech synthesis information necessary for speech synthesis. Term information is information relating to a single term. The configuration of the term information may differ for each language. Also, the "two or more languages that can be subjected to speech translation" preferably are three or more languages.

Also, in the present embodiment, a speech translation system will be described that, if an apparatus that performs the speech recognition, translation or speech synthesis processing does not have necessary information at the corresponding processing stage, executes processing for obtaining, from a dictionary server that includes the all-language group dictionary, information necessary for the apparatus to perform the corresponding processing in real-time (hereinafter referred to as "real-time supplementing processing").

Also, in the present embodiment, a dictionary server will be described that has, for example, a function of acquiring information of new terms and the like from one or more Web servers through an operation such as crawling so as to improve the all-language group dictionary, or a function of accepting information accumulated in the all-language group dictionary from an unspecified or a specified number of users.

FIG. 1 is a conceptual diagram of a speech translation system 1 of the present embodiment. The speech translation system 1 includes one or more first terminal apparatuses 11, one or more second terminal apparatuses 12, a dictionary server 13, one or more speech recognition servers 14, one or more translation servers 15, one or more speech synthesis servers 16, and one or more third terminal apparatuses 17.

In the speech translation system 1, for example, if a Japanese user (user A) of a first terminal apparatus 11 said "Ohayo" in Japanese, the speech recognition server 14 performs speech recognition on "Ohayo", which is Japanese. The translation server 15 translates a result of the speech recognition into, for example, English, namely, "Good morning". Next, the speech synthesis server 16 generates speech information of "Good morning" from the English text "Good morning". Then, the utterance "Good morning" is output from the second terminal apparatus 12 of a user B, who is a native English speaker.

The first terminal apparatus 11 and the second terminal apparatus 12 are, for example, terminals for talking (including telephones and mobile phones). Here, a description is given assuming that, mainly, the first terminal apparatus 11 is the speaking-side terminal, and the second terminal apparatus 12 is the spoken-side terminal, but needless to say, both terminals are interchangeable.

Also, the dictionary server 13 holds all information used by the speech recognition servers 14, the translation servers 15 and the speech synthesis servers 16. This information constitutes the all-language group dictionary described above.

In addition, the third terminal apparatus 17 is a terminal for adding information to the all-language group dictionary and inputting information for improving the all-language group dictionary.

FIG. 2 is a block diagram of the speech translation system 1 of the present embodiment. FIG. 3 is a block diagram of the dictionary server 13. FIG. 4 is a block diagram of a speech recognition server 14. FIG. 5 is a block diagram of a translation server 15. FIG. 6 is a block diagram of a speech synthesis server 16.

The first terminal apparatus 11 includes a first speech accepting unit 111, a first speech sending unit 112, a first speech receiving unit 113, and a first speech output unit 114.

The second terminal apparatus 12 includes a second speech accepting unit 121, a second speech sending unit 122, a second speech receiving unit 123, and a second speech output unit 124.

As shown in FIG. 3, the dictionary server 13 includes an all-language group dictionary storage unit 131, an information-for-speech-recognition sending unit 132, an information-for-translation sending unit 133, an information-for-speech-synthesis sending unit 134, a written form acquiring unit 135, a written form accumulation unit 136, an information accepting unit 137, an information accumulation unit 138, and an output unit 139.

As shown in FIG. 4, the speech recognition server 14 includes an information-for-speech-recognition storage unit 141, an information-for-speech-recognition receiving unit 142, an information-for-speech-recognition accumulation unit 143, a speech information receiving unit 144, a speech recognition unit 145, and a speech recognition result sending unit 146. The speech recognition unit 145 includes a speech recognition determination section 1451, a speech recognition information sending instruction section 1452, and a speech recognition section 1453.

As shown in FIG. 5, the translation server 15 includes an information-for-translation storage unit 151, an information-for-translation receiving unit 152, an information-for-translation accumulation unit 153, a speech recognition result receiving unit 154, a translation unit 155, and a translation result sending unit 156. The translation unit 155 includes a translation determination section 1551, a translation information sending instruction section 1552, and a translation section 1553.

As shown in FIG. 6, the speech synthesis server 16 includes an information-for-speech-synthesis storage unit 161, an information-for-speech-synthesis receiving unit 162, an information-for-speech-synthesis accumulation unit 163, a translation result receiving unit 164, a speech synthesis unit 165, and a speech synthesis result sending unit 166. The speech synthesis unit 165 includes a speech synthesis determination section 1651, a speech synthesis information sending instruction section 1652, and a speech synthesis section 1653.

The third terminal apparatus 17 includes an input accepting unit 171, an information receiving unit 172, an information output unit 173, and an input information sending unit 174.

The first speech accepting unit 111 accepts speech from a user (referred to as the "user A") of the first terminal apparatus 11. The first speech accepting unit 111 can be realized by, for example, a microphone, a device driver thereof, and the like.

The first speech sending unit 112 sends the speech accepted by the first speech accepting unit 111. The speech is sent to any of the one or more speech recognition servers 14. Note that the first speech sending unit 112 may send the speech to two or more speech recognition servers 14. Also, here, "speech" refers to information of the speech, and it is preferable that speech to be sent is digitalized. Also the first speech sending unit 112 may send speech translation control information with the speech. The speech translation control information includes information for the speech recognition server 14, the translation server 15, and the speech synthesis server 16 respectively performing speech recognition, translation, and speech synthesis, or sending processing results. The speech translation control information includes, for example, information that identifies the sending destination of a processing result (e.g., IP address or telephone number), information that identifies the source language and the target language (e.g., Japanese, English, or German), for example. The first terminal apparatus 11 and the second terminal apparatus 12 accepts, for example, the source language and the target language from the user. Alternatively, the first terminal apparatus 11 and the second terminal apparatus 12 automatically decide the source language and the target language based on, for example, the telephone numbers or the IP addresses of the second terminal apparatus 12 and the first terminal apparatus 11. In this case, the second terminal apparatus 12 and the first terminal apparatus 11 hold information identifying a language in association with information such as the telephone number or the IP number, or acquire the information identifying a language from other apparatuses by using, as the key, information such as the telephone number or the IP number. Also, the first terminal apparatus 11 and the second terminal apparatus 12 acquire information identifying the speech recognition server 14 to be subjected to speech recognition (e.g., IP address), information identifying the translation server 15 (e.g., IP address), and information identifying the speech synthesis server 16 (e.g., IP address) based on the source language and the target language. That is, the first terminal apparatus 11 and the second terminal apparatus 12 include the source language and the target language in association with information identifying servers, or acquires, from other apparatuses, information identifying servers by using the source language and the target language. Also, the speech translation control information may also include information indicating the format of input speech, information indicating the format of output speech, information designating the quality of input/output speech, and information indicating the format of input text, information indicating the format of output text, for example. Furthermore, the first speech sending unit 112 may send speech to one or more speech recognition servers 14 directly or via another apparatus (indirectly). The first speech sending unit 112 is generally realized by a wireless or wired communication means, but may also be realized by a broadcasting means.

The first speech receiving unit 113 receives speech (normally, this is digitalized speech information). This speech is obtained by translating the content of speech uttered by a user (referred to as the "user B") of the second terminal apparatus 12 into a language that the user A of the first terminal apparatus 11 can understand. The first speech receiving unit 113 receives speech from the speech synthesis server 16 directly or indirectly. The first speech receiving unit 113 is generally realized by a wireless or wired communication means, but may be realized by a means for receiving broadcasting.

The first speech output unit 114 outputs the speech received by the first speech receiving unit 113. The first speech output unit 114 may or may not include a speaker (output device). The first speech output unit 114 can be realized by a driver software of an output device, or a driver software of an output device and an output device, etc.

The second speech accepting unit 121 accepts speech from the user B of the second terminal apparatus 12. The second speech accepting unit 121 can be realized by, for example, a microphone, a device driver thereof, and the like.

The second speech sending unit 122 sends the speech accepted by the second speech accepting unit 121. The speech is sent to any of the one or more speech recognition servers 14. Note that the second speech sending unit 122 may send the speech to two or more speech recognition servers 14. Here, "speech" refers to information of the speech, and it is preferable that speech to be sent is digitalized. Furthermore, the second speech sending unit 122 may send speech to one or more speech recognition servers 14 directly or via another apparatus (indirectly). The second speech sending unit 122 is generally realized by a wireless or wired communication means, but may also be realized by a broadcasting means.

The second speech receiving unit 123 receives speech (normally, this is digitalized speech information). This speech is obtained by translating the content of speech uttered by the user A of the first terminal apparatus 11 into a language that the user B of the second terminal apparatus 12 can understand (target language). The second speech receiving unit 123 receives speech from the speech synthesis server 16 directly or indirectly. The second speech receiving unit 123 is generally realized by a wireless or wired communication means, but may be realized by a means for receiving broadcasting.

The second speech output unit 124 outputs the speech received by the second speech receiving unit 123. The second speech output unit 124 may or may not include a speaker (output device). The first speech output unit 114 can be realized by a driver software of an output device, or a driver software of an output device and an output device, etc.

The all-language group dictionary storage unit 131 has stored therein the all-language group dictionary. A description of the all-language group dictionary was given above. Note that speech recognition information included in the all-language group dictionary refers to, for example, an acoustic model based on a Hidden Markov Model (HMV), for example. Also, translation information included in the all-language group dictionary refers to, for example, a written form of a term. If the written form of a term in Japanese is "大阪", the written form thereof is "Osaka" in English, and "大阪" in Chinese. Note that a term is understood as a broad concept that includes a single word, one or more words, one or more phrases, a sentence, for example. The speech synthesis information refers to information on reading (this will be referred to as "reading" when appropriate) and accent information (this will be referred to as "accent" when appropriate), for example. The term information generally includes reading of a term. The term information includes, for example, information on the written form, reading, accent, tone and the like. The structure of the term information generally differs for each language. For example, if the language of a term is German, its term information includes flag information indicating whether the term is masculine or feminine. Note that such flag information does not exist in the term information for Japanese and English, for example.

Also, the all-language group dictionary generally includes structure information for each language. Examples of the structure information of the all-language group dictionary are as follows: "Japanese <HMM><written form><reading><accent>"; "English<HMM><written form><reading><accent><tone>"; and "Germany<written form><flag information><reading><accent>". Note that information of structure common to languages may be managed integrally, and only structure information indicating information unique to a specific language may be managed for that language. In such a case, an example of the structure information will be as follows: common structure information "<HMM><written form><reading><accent>", and "German<flag information>".

The all-language group dictionary storage unit 131 is preferably a non-volatile recording medium, but it can be realized also by a volatile recording medium. There is no restriction to the process by which the various types of information are stored in the all-language group dictionary storage unit 131. For example, various types of information may be stored in the all-language group dictionary storage unit 131 via a recording medium, or various types of information sent via a communication line or the like may be stored in the all-language group dictionary storage unit 131. Alternatively, various types of information input via an input device may be stored in the all-language group dictionary storage unit 131. Note that it is preferable that information is accumulated in the all-language group dictionary storage unit 131 by the written form acquiring unit 135, the written form accumulation unit 136, the information accepting unit 137, the information accumulation unit 138, and the like.

The information-for-speech-recognition sending unit 132 reads out information for speech recognition from the all-language group dictionary storage unit 131, and sends the information for speech recognition to one or more speech recognition servers 14. Information for speech recognition is information that includes speech recognition information of a term, and that is used for speech recognition by the speech recognition servers 14. Information for speech recognition is information that includes speech recognition information for all or some of two or more languages. The information for speech recognition may be the same as the speech recognition information, or may be information acquired by adding other information to the speech recognition information. Also, it is favorable that the information-for-speech-recognition sending unit 132 does not send speech recognition information of a term whose information for speech recognition is partially missing. The information-for-speech-recognition sending unit 132 is generally realized by a wireless or wired communication means, but may also be realized by a broadcasting means.

The information-for-translation sending unit 133 reads out information for translation from the all-language group dictionary storage unit 131, and sends the information for translation to one or more translation servers 15. Information for translation is information that includes a written form of a term, and that is used for translation by the translation servers 15. Information for translation is information that includes written forms for all or some of two or more languages. The information for translation may be made up of only the written form, or may be information acquired by adding other information to the written form. Also, it is favorable that the information-for-translation sending unit 133 does not send translation information of a term whose information for translation is partially missing. That is, in the case of term information that has a written form in Japanese only, it is preferable that the information of that term information is not sent. The information-for-translation sending unit 133 is generally realized by a wireless or wired communication means, but may also be realized by a broadcasting means.

The information-for-speech-synthesis sending unit 134 reads out information for speech synthesis from the all-language group dictionary storage unit 131, and sends the information for speech synthesis to one or more speech synthesis servers 16. Information for speech synthesis is information that includes speech synthesis information of a term, and that is used for speech synthesis by the speech synthesis server 16. Information for speech synthesis is information that includes speech synthesis information for all or some of two or more languages. The information for speech synthesis may be the same as the speech synthesis information, or may be information acquired by adding other information to the speech synthesis information. Also, it is favorable that the information-for-speech-synthesis sending unit 134 does not send speech synthesis information of a term whose information for speech synthesis is partially missing. The information-for-speech-synthesis sending unit 134 is generally realized by a wireless or wired communication means, but may also be realized by a broadcasting means.

The written form acquiring unit 135 acquires written forms of terms that do not exist in the all-language group dictionary storage unit 131 from web pages of one or more Web servers on the Internet. It is preferable that the written form acquiring unit 135 acquires, when acquiring a written form, a language identifier that is information identifying the language as well. The written form acquiring unit 135 acquires, for example, the language identifier "Japanese" if the URL of the web page from which a term is acquired includes ".jp", and the language identifier "Korean" if the URL includes ".kr". Also, the written form acquiring unit 135 may automatically identify the language based on the character code included in the database or the web page from which the term is acquired, for example. In addition, the written form acquiring unit 135 may, after it has acquired a term from a web page, request a user to input the language thereof.

Also, acquisition of the term by the written form acquiring unit 135 may be deemed performed if the written form acquiring unit 135 has acquired a term from a web page, searched the all-language group dictionary storage unit 131 by using the term as the key, and determined that the term does not exist in the all-language group dictionary storage unit 131. That is, in this case, the written form acquiring unit 135 may discard a term acquired when the term exists in the all-language group dictionary storage unit 131.

The written form acquiring unit 135 can be generally realized by an MPU, memory, communication means, or the like. The processing procedure of the written form acquiring unit 135 is generally realized by software, and the software for this is recorded in a recording medium such as a ROM. Note that the processing procedure also may be realized by hardware (dedicated circuitry). The written form acquiring unit 135 may perform processing for activating a so-called search engine. In this case, the written form acquiring unit 135 may or may not include the search engine.

The written form accumulation unit 136 accumulates the written form of the term acquired by the written form acquiring unit 135 in the all-language group dictionary storage unit 131. Generally, the written form accumulation unit 136 accumulates the written form of the term as the written form in the language corresponding to the language identifier acquired by the written form acquiring unit 135. The written form accumulation unit 136 can be generally realized by an MPU, memory or the like. The processing procedure of written form accumulation unit 136 is generally realized by software, and the software for this is recorded in a recording medium such as a ROM. Note that the processing procedure also may be realized by hardware (dedicated circuitry).

The information accepting unit 137 accepts any information of the term information from one or more third terminal apparatuses 17. Accepted information includes, for example, HMM, written form, reading, accent, tone, and flag information. The information accepting unit 137 normally accepts information together with information that identifies the language of the accepted information, and the written form corresponding to the accepted information or the like. That is, it is of course possible to identify the written form, reading or the like and the language thereof that correspond to the accepted information. Here, "accept" refers to a concept that includes acceptance of information input from input devices such as a keyboard, a mouse, and a touch panel, receipt of information sent via a wired or wireless communication line, acceptance of information read out from recording media such as an optical disk, a magnetic disk, and a semiconductor memory, and the like. The information accepting unit 137 can be generally realized by, for example, wired or wireless communication means.

The information accumulation unit 138 accumulates the information accepted by the information accepting unit 137 in association with the written form of the term corresponding to the accepted information in the language corresponding to the accepted information. Also, if the information accepting unit 137 has accepted a written form, it accumulates the written form in the region of the corresponding language. Also, if the information accepting unit 137 has accepted a written form, and other information thereof such as reading is already present, the written form is accumulated in association with the reading of the term corresponding to the written form in the language corresponding to the written form. The information accumulation unit 138 can be generally realized by an MPU, memory or the like. The processing procedure of the information accumulation unit 138 is generally realized by software, and the software for this is recorded in a recording medium such as a ROM. Note that the processing procedure also may be realized by hardware (dedicated circuitry).

The output unit 139 outputs the all-language term information or part of the all-language term information. The output unit 139 generally outputs information according to an instruction from the third terminal apparatus 17 or a user. Here, "output" generally refers to sending of information to the third terminal apparatus 17 that sent the instruction. It is preferable that, when the all-language term information or part of the all-language term information is output, the output unit 139 outputs the all-language term information or part of the all-language term information in visually different manners between the case where all the predetermined information exists with respect to all of the two or more languages, and the case where part of the predetermined information is missing. All the predetermined information refers to information corresponding to the structure information that the all-language group dictionary storage unit 131 has. The output unit 139 is generally realized by a wireless or wired communication means, but may also be realized by a broadcasting means.

The information-for-speech-recognition storage unit 141 can have stored therein information for speech recognition with respect to all of the two or more languages, or at least two of the two or more languages. The information-for-speech-recognition storage unit 141 is preferably a non-volatile recording medium, but it can be realized also by a volatile recording medium.

Normally, information for speech recognition is stored in the information-for-speech-recognition storage unit 141 by receiving the information for speech recognition from the dictionary server 13. There is no restriction to the process by which information for speech recognition is stored in the information-for-speech-recognition storage unit 141. For example, the information for speech recognition may be stored in the information-for-speech-recognition storage unit 141 via a recording medium, or the information for speech recognition input via an input device may be stored in the information-for-speech-recognition storage unit 141.

The information-for-speech-recognition receiving unit 142 receives, from the dictionary server 13, information for speech recognition with respect to all of the two or more languages, or at least two of the two or more languages. The information-for-speech-recognition receiving unit 142 may receive speech recognition information from the dictionary server 13 in response to sending of an instruction to the dictionary server 13 by the speech recognition information sending instruction section 1452. The information-for-speech-recognition receiving unit 142 is generally realized by a wireless or wired communication means, but may be realized by a means for receiving broadcasting.

The information-for-speech-recognition accumulation unit 143 accumulates the information for speech recognition received by the information-for-speech-recognition receiving unit 142 in the information-for-speech-recognition storage unit 141. Also, the information-for-speech-recognition accumulation unit 143 accumulates the speech recognition information received by the information-for-speech-recognition receiving unit 142 in the information-for-speech-recognition storage unit 141. The information-for-speech-recognition accumulation unit 143 can be generally realized by an MPU, memory or the like. The processing procedure of the information-for-speech-recognition accumulation unit 143 is generally realized by software, and the software for this is recorded in a recording medium such as a ROM. Note that the processing procedure also may be realized by hardware (dedicated circuitry).

The speech information receiving unit 144 receives speech information, which is information of speech input to the first terminal apparatus 11. The speech information receiving unit 144 receives the speech information directly or indirectly from the first terminal apparatus 11. The speech information receiving unit 144 is generally realized by a wireless or wired communication means, but may be realized by a means for receiving broadcasting.

The speech recognition unit 145 performs speech recognition on the speech information received by the speech information receiving unit 144 by using the information for speech recognition in the information-for-speech-recognition storage unit 141, and acquires a result of the speech recognition. The speech recognition result generally is a character string of a source language (the language of the speech uttered by the user A of the first terminal apparatus 11). The method of speech recognition performed by the speech recognition unit 145 may be any speech recognition method. The speech recognition unit 145 will not be described in detail since it is well known. The speech recognition unit 145 can be generally realized by an MPU, memory or the like. The processing procedure of the speech recognition unit 145 is generally realized by software, and the software for this is recorded in a recording medium such as a ROM. Note that the processing procedure also may be realized by hardware (dedicated circuitry).

The speech recognition determination section 1451 determines whether speech recognition processing performed on the speech information received by the speech information receiving unit 144 has succeeded or failed. The speech recognition determination section 1451 determines, for example, whether speech recognition information that corresponds to partial speech information exists in the information-for-speech-recognition storage unit 141, the partial speech information being information that is included in the speech information received by the speech information receiving unit 144 and that corresponds to one or more terms. Note that here, the partial speech information generally refers to part of the speech information, but the partial speech information can be the same as the speech information. Also, the speech recognition determination section 1451 may cause the speech recognition section 1453 to perform speech recognition processing on the speech information received by the speech information receiving unit 144, and determine whether the result thereof is a success or a failure. If the result is a success, the speech recognition information corresponding to the partial speech information exists in the information-for-speech-recognition storage unit 141. If the result is a failure, the speech recognition information corresponding to the partial speech information does not exist in the information-for-speech-recognition storage unit 141. Note that the speech recognition determination section 1451 may determine that the speech recognition processing has succeeded if the likelihood of the speech recognition result is greater than (or greater than or equal to) a predetermined value, and that the speech recognition processing has failed if the likelihood of the speech recognition result is less than or equal to (or less than) the predetermined value. The speech recognition determination section 1451 can be generally realized by an MPU, memory or the like. The processing procedure of the speech recognition determination section 1451 is generally realized by software, and the software for this is recorded in a recording medium such as a ROM. Note that the processing procedure also may be realized by hardware (dedicated circuitry).

The speech recognition information sending instruction section 1452 issues, to the dictionary server 13, an instruction to send speech recognition information, if it is determined that the speech recognition processing performed on the speech information received by the speech information receiving unit 144 has failed. For example, if the speech recognition determination section 1451 has determined that the speech recognition information does not exist in the information-for-speech-recognition storage unit 141, the speech recognition information sending instruction section 1452 issues, to the dictionary server 13, an instruction to send the speech recognition information. Note that this instruction includes, for example, partial speech information, the language identifier, and the like. The instruction also includes, for example, a phoneme sequence, the language identifier, and the like generated from the partial speech information. The speech recognition information sending instruction section 1452 is generally realized by a wireless or wired communication means, but may also be realized by a broadcasting means.

The speech recognition section 1453 performs speech recognition on the speech information received by the speech information receiving unit by using the information for speech recognition in the information-for-speech-recognition storage unit, and acquires a result of the speech recognition. Also, the speech recognition section 1453 performs speech recognition by using the speech recognition information that the information-for-speech-recognition receiving unit 142 has received from the dictionary server 13 in response to sending of an instruction by the speech recognition information sending instruction section 1452, and acquires a result of the speech recognition. Also, if the speech recognition determination section 1451 has determined that the speech recognition information exists in the information-for-speech-recognition storage unit 141, the speech recognition section 1453 performs speech recognition by using information for speech recognition in the information-for-speech-recognition storage unit 141, and acquires a result of the speech recognition. The speech recognition section 1453 can be generally realized by an MPU, memory or the like. The processing procedure of speech recognition section 1453 is generally realized by software, and the software for this is recorded in a recording medium such as a ROM. Note that the processing procedure also may be realized by hardware (dedicated circuitry).

The speech recognition result sending unit 146 sends the speech recognition result acquired by the speech recognition unit 145. The speech recognition result sending unit 146 sends the speech recognition result to the translation server 15 directly or indirectly. The speech recognition result sending unit 146 is generally realized by a wireless or wired communication means, but may also be realized by a broadcasting means.

The information-for-translation storage unit 151 can have stored therein information for translation with respect to all of the two or more languages, or at least two of the two or more languages. The information for translation refers to, for example, a translation model and a language model. The information-for-translation storage unit 151 is preferably a non-volatile recording medium, but it can be realized also by a volatile recording medium.

Normally, information for translation is stored in the information-for-translation storage unit 151 by receiving the information for translation from the dictionary server 13. There is no restriction to the process by which information for translation is stored in the information-for-translation storage unit 151. For example, the information for translation may be stored in the information-for-translation storage unit 151 via a recording medium, or the information for translation input via an input device may be stored in the information-for-translation storage unit 151.

The information-for-translation receiving unit 152 receives, from the dictionary server 13, information for translation with respect to all of the two or more languages, or at least two of the two or more languages. The information-for-translation receiving unit 152 receives a written form of a term in a target language from the dictionary server 13 in response to sending of an instruction to the dictionary server 13 by the translation information sending instruction section 1552. The information-for-translation receiving unit 152 is generally realized by a wireless or wired communication means, but may be realized by a means for receiving broadcasting.

The information-for-translation accumulation unit 153 accumulates, in the information-for-translation storage unit 151, the information for translation received by the information-for-translation receiving unit 152. Also, the information-for-translation accumulation unit 153 accumulates, in the information-for-translation storage unit 151, the written form of the term in the target language received by the information-for-translation receiving unit 152. The information-for-translation accumulation unit 153 can be generally realized by an MPU, memory or the like. The processing procedure of the information-for-translation accumulation unit 153 is generally realized by software, and the software for this is recorded in a recording medium such as a ROM. Note that the processing procedure also may be realized by hardware (dedicated circuitry).

The speech recognition result receiving unit 154 receives the speech recognition result received by the speech recognition server 14. The speech recognition result receiving unit 154 receives the speech recognition result directly or indirectly from the speech recognition server 14. The speech recognition result receiving unit 154 is generally realized by a wireless or wired communication means, but may be realized by a means for receiving broadcasting.

The translation unit 155 translates the speech recognition result received by the speech recognition result receiving unit 154 into the target language by using the information for translation in the information-for-translation storage unit 151, and acquires a translation result. There is no restriction to the translation algorithm or the like used in the translation unit 155. The translation unit 155 will not be described in detail since it is well known. The translation unit 155 can be generally realized by an MPU, memory or the like. The processing procedure of the translation unit 155 is generally realized by software, and the software for this is recorded in a recording medium such as a ROM. Note that the processing procedure also may be realized by hardware (dedicated circuitry).

The translation determination section 1551 determines whether translation processing performed on the speech recognition result received by the speech recognition result receiving unit 154 has succeeded or failed. The translation determination section 1551 determines, for example, whether the written form of the term in the target language that corresponds to a partial speech recognition result (normally, the character string of the term in the source language) exists in the information-for-translation storage unit 151, the partial speech recognition result being information that is included in the speech recognition result received by the speech recognition result receiving unit 154 and that corresponds to one or more terms. Note that here, the partial speech recognition result generally refers to part of the speech recognition result, but the partial speech recognition result can be the same as the speech recognition result. Also, the translation determination section 1551 may cause the translation section 1553 to perform translation processing on the speech recognition result received by the speech recognition result receiving unit 154, and determine whether the result thereof is a success or a failure. If the result is a success, the written form of the term in the target language corresponding to the partial speech recognition result exists in the information-for-translation storage unit 151. If the result is a failure, the written form of the term in the target language corresponding to the partial speech recognition result does not exist in the information-for-translation storage unit 151. Note that the translation determination section 1551 may determine that the translation processing has succeeded if the likelihood of the translation result is greater than (or greater than or equal to) a predetermined value, and that the translation processing has failed if the likelihood of the translation result is less than or equal to (or less than) the predetermined value. The translation determination section 1551 can be generally realized by an MPU, memory or the like. The processing procedure of the translation determination section 1551 is generally realized by software, and the software for this is recorded in a recording medium such as a ROM. Note that the processing procedure also may be realized by hardware (dedicated circuitry).

The translation information sending instruction section 1552 issues, to the dictionary server 13, an instruction to send the written form of the term in the target language, if the translation determination section 1551 has determined that the written form of the term in the target language does not exist in the information-for-translation storage unit 151. This instruction includes, for example, the written form of the term in the source language and the language identifier of the target language. The translation information sending instruction section 1552 is generally realized by a wireless or wired communication means, but may also be realized by a broadcasting means.

The translation section 1553 translates the speech recognition result received by the speech recognition result receiving unit 154 into the target language by using the information for translation in the information-for-translation storage unit 151, and acquires a translation result. Also, the translation section 1553 translates the speech recognition result into the target language by using the written form of the term in the target language that the information-for-translation receiving unit 152 has received from the dictionary server 13 in response to sending of an instruction by the translation information sending instruction section 1552, and acquires a translation result. Also, if, for example, the translation determination section 1551 has determined that the written form of the term in the target language exists in the information-for-translation storage unit 151, the translation section 1553 translates the speech recognition result by using the written form of the term in the target language in the information-for-translation storage unit 151, and acquires a translation result. Note that the translation result generally refers to a character string of the term in the target language. The translation section 1553 can be generally realized by an MPU, memory or the like. The processing procedure of the translation section 1553 is generally realized by software, and the software for this is recorded in a recording medium such as a ROM. Note that the processing procedure also may be realized by hardware (dedicated circuitry).

The translation result sending unit 156 sends the translation result acquired by the translation unit 155. The translation result sending unit 156 sends the translation result to the speech synthesis server 16 directly or indirectly. The translation result sending unit 156 is generally realized by a wireless or wired communication means, but may also be realized by a broadcasting means.

The information-for-speech-synthesis storage unit 161 can have stored therein information for speech synthesis with respect to all of the two or more languages, or at least two of the two or more languages. The information-for-speech-synthesis storage unit 161 is preferably a non-volatile recording medium, but it can be realized also by a volatile recording medium.

Normally, information for speech synthesis can be stored in the information-for-speech-synthesis storage unit 161 by receiving the information for speech synthesis from the dictionary server 13. There is no restriction to the process by which the information for speech synthesis is stored in the information-for-speech-synthesis storage unit 161. For example, the information for speech synthesis may be stored in the information-for-speech-synthesis storage unit 161 via a recording medium, or the information for speech synthesis input via an input device may be stored in the information-for-speech-synthesis storage unit 161.

The information-for-speech-synthesis receiving unit 162 receives, from the dictionary server 13, information for speech synthesis with respect to all of the two or more languages, or at least two of the two or more languages. The information-for-speech-synthesis receiving unit 162 receives speech synthesis information from the dictionary server 13 in response to sending of an instruction to the dictionary server 13 by the speech synthesis information sending instruction section 1652. The information-for-speech-synthesis receiving unit 162 is generally realized by a wireless or wired communication means, but may be realized by a means for receiving broadcasting.

The information-for-speech-synthesis accumulation unit 163 accumulates the information for speech synthesis received by the information-for-speech-synthesis receiving unit 162 in the information-for-speech-synthesis storage unit 161. Also, the information-for-speech-synthesis accumulation unit 163 accumulates the speech synthesis information received by the information-for-speech-synthesis receiving unit 162 in the information-for-speech-synthesis storage unit 161. The information-for-speech-synthesis accumulation unit 163 can be generally realized by an MPU, memory or the like. The processing procedure of the information-for-speech-synthesis accumulation unit 163 is generally realized by software, and the software for this is recorded in a recording medium such as a ROM. Note that the processing procedure also may be realized by hardware (dedicated circuitry).

The translation result receiving unit 164 receives the translation result acquired by the translation server 15. The translation result receiving unit 164 receives the translation result from the translation server 15 directly or indirectly. The translation result receiving unit 164 is generally realized by a wireless or wired communication means, but may be realized by a means for receiving broadcasting.

The speech synthesis unit 165 performs speech synthesis on the translation result received by the translation result receiving unit 164 by using the information for speech synthesis in the information-for-speech-synthesis storage unit 161, and acquires a speech synthesis result. There is no restriction to the algorithm or the like used in the speech synthesis. The speech synthesis unit 165 will not be described in detail since it is well known. The speech synthesis unit 165 can be generally realized by an MPU, memory or the like. The processing procedure of the speech synthesis unit 165 is generally realized by software, and the software for this is recorded in a recording medium such as a ROM. Note that the processing procedure also may be realized by hardware (dedicated circuitry).

The speech synthesis determination section 1651 determines whether the speech synthesis processing performed on the translation result received by the translation result receiving unit 164 has succeeded or failed. The speech synthesis determination section 1651 determines, for example, whether speech synthesis information that corresponds a partial translation result exists in the information-for-speech-synthesis storage unit 161, the partial translation result being information that is included in the translation result received by the translation result receiving unit 164 and that corresponds to one or more terms. Note that here, the partial translation result generally refers to part of the translation result, but the partial translation result can be the same as the translation result. Also, the speech synthesis determination section 1651 may cause the speech synthesis section 1653 to perform the speech synthesis processing on the translation result received by the translation result receiving unit 164, and may determine whether the result thereof is a success or a failure. If the result is a success, speech synthesis information corresponding to the partial translation result exists in the information-for-speech-synthesis storage unit 161. If the result is a failure, speech synthesis information corresponding to the partial translation result does not exist in the information-for-speech-synthesis storage unit 161. Note that the speech synthesis determination section 1651 may determine that the speech synthesis processing has succeeded if the likelihood of the speech synthesis result is greater than (or greater than or equal to) a predetermined value, and that the speech synthesis processing has failed if the likelihood of the speech synthesis result is less than or equal to (or less than) the predetermined value. The speech synthesis determination section 1651 can be generally realized by an MPU, memory or the like. The processing procedure of the speech synthesis determination section 1651 is generally realized by software, and the software for this is recorded in a recording medium such as a ROM. Note that the processing procedure also may be realized by hardware (dedicated circuitry).

The speech synthesis information sending instruction section 1652 sends an instruction to send speech synthesis information to the dictionary server 13, if it has been determined that the speech synthesis processing performed on the translation result received by the translation result receiving unit 164 has failed. For example, the speech synthesis information sending instruction section 1652 issues, to the dictionary server 13, an instruction to send speech synthesis information, if the speech synthesis determination section 1651 has determined that the speech synthesis information does not exist in the information-for-speech-synthesis storage unit 161. Note that this instruction includes, for example, the written form of the term in the target language (partial translation result) and the language identifier of the target language. The speech synthesis information sending instruction section 1652 is generally realized by a wireless or wired communication means, but may also be realized by a broadcasting means.

The speech synthesis section 1653 performs speech synthesis on the translation result received by the translation result receiving unit 164 by using information for speech synthesis in the information-for-speech-synthesis storage unit 161, and acquires a speech synthesis result. Also, the speech synthesis section 1653 performs speech synthesis on the partial translation result by using the speech synthesis information that the information-for-speech-synthesis receiving unit 162 has received from the dictionary server 13 in response to sending of an instruction by the speech synthesis information sending instruction section 1652, and acquires a speech synthesis result. Also, for example, if the speech synthesis determination section 1651 has determined that the speech synthesis information exists in the information-for-speech-synthesis storage unit 161, the speech synthesis section 1653 may perform speech synthesis on the partial translation result by using the information for speech synthesis in the information-for-speech-synthesis storage unit 161, and acquire a speech synthesis result. The speech synthesis result generally refers to information of speech in the target language. The speech synthesis section 1653 can be generally realized by an MPU, memory or the like. The processing procedure of the speech synthesis section 1653 is generally realized by software, and the software for this is recorded in a recording medium such as a ROM. Note that the processing procedure also may be realized by hardware (dedicated circuitry).

The speech synthesis result sending unit 166 sends the speech synthesis result acquired by the speech synthesis unit 165 to the second terminal apparatus 12. The speech synthesis result sending unit 166 sends the speech synthesis result to the second terminal apparatus 12, directly or indirectly. The speech synthesis result sending unit 166 is generally realized by a wireless or wired communication means, but may also be realized by a broadcasting means.

The input accepting unit 171 accepts an input of various types of instructions or information from the user. The instructions or information may be input by any means such as a numerical keypad, a keyboard, a mouse, and a menu screen. The input accepting unit 171 can be realized by a device driver of the input means such as a numerical keypad or a keyboard, menu screen control software, or the like.

The information receiving unit 172 receives information from the dictionary server 13. This received information is the all-language term information or part of the all-language term information. The information receiving unit 172 is generally realized by a wireless or wired communication means, but may be realized by a means for receiving broadcasting.

The information output unit 173 outputs the information received by the information receiving unit 172. The information output unit 173 outputs the received information (the all-language term information or part of the all-language term information) in visually different manners between the case where all the predetermined information exists with respect to all of the two or more languages, and the case where part of the predetermined information is missing. The information output unit 173 may or may not include an output device such as a display or a speaker. The information output unit 173 can be realized by a driver software of an output device, or a driver software of an output device and an output device, etc.

The input information sending unit 174 sends the instruction or information accepted by the input accepting unit 171 to the dictionary server 13. The input information sending unit 174 is generally realized by a wireless or wired communication means, but may also be realized by a broadcasting means.

Next, an operation performed by the speech translation system 1 will be described. First, an operation performed by the first terminal apparatus 11 will be described. The first speech accepting unit 111 of the first terminal apparatus 11 accepts speech uttered by the user A in a language A. Then, the first speech sending unit 112 handles the accepted speech as speech information and sends the speech information (this may be simply referred to as "speech"). The first speech receiving unit 113 receives speech information in the language A obtained by performing speech translation on speech information uttered by the user B in a language B. Next, the first speech output unit 114 outputs the speech information in the language A as speech.

Next, an operation performed by the second terminal apparatus 12 will be described. The second speech receiving unit 123 of the second terminal apparatus 12 receives speech information in the language B obtained by performing speech translation on speech uttered by the user A in the language A. Then, the second speech output unit 124 outputs the speech information in the language B received by the second speech receiving unit 123 as speech. Also, the second speech accepting unit 121 accepts speech in the language B from the user B of the second terminal apparatus 12. The second speech sending unit 122 then sends the speech in the language B accepted by the second speech accepting unit 121 as speech information.

Next, an operation performed by the dictionary server 13 will be described with reference to the flowchart in FIG. 7.

(Step S701) The dictionary server 13 determines whether an instruction has been received from an external apparatus. If an instruction has been received, the procedure proceeds to step S702, and if not, the procedure proceeds to step S706.

(Step S702) The dictionary server 13 determines whether the instruction accepted in step S701 is an instruction to send information. If it is an instruction to send information, the procedure proceeds to step S703, and if not, the procedure proceeds to step S705.

(Step S703) The information-for-speech-recognition sending unit 132, the information-for-translation sending unit 133, or the information-for-speech-synthesis sending unit 134 of the dictionary server 13 searches the all-language group dictionary storage unit 131 for information corresponding to the instruction accepted in step S701 and acquires information necessary for speech recognition, information necessary for translation, or information necessary for speech synthesis. More specifically, for example, the information-for-speech-recognition sending unit 132 searches the all-language group dictionary storage unit 131 by using, as the key, the speech information, speech recognition for which has failed, and the language identifier included the instruction accepted in step S701, and acquires speech recognition information (e.g., an acoustic model). Also, for example, the information-for-translation sending unit 133 searches the all-language group dictionary storage unit 131 by using, as the key, the speech recognition result (this may be part of the speech recognition result), translation of which has failed, the source language identifier, and the target language identifier included in the instruction accepted in step S701, and acquires translation information (e.g., the written form of the term in the target language). Furthermore, for example, the information-for-speech-synthesis sending unit 134 searches the all-language group dictionary storage unit 131 by using, as the key, the translation result (this may be part of the translation result), speech synthesis for which has failed, and the target language identifier included in the instruction accepted in step S701, and acquires speech synthesis information (e.g., reading and accent information of the term).

(Step S704) The information-for-speech-recognition sending unit 132, information-for-translation sending unit 133, or the information-for-speech-synthesis sending unit 134 sends the information acquired in step S703. The sending destination is the apparatus that has sent the instruction (the speech recognition server 14, the translation server 15, or the speech synthesis server 16). Then, the procedure returns to step S701.

(Step S705) The dictionary server 13 performs processing corresponding to the instruction accepted in step S701. For example, if the instruction is an instruction to output information (sending instruction), the output unit 139 searches the all-language group dictionary storage unit 131 for information corresponding to the instruction, and sends the information acquired by the search to the apparatus that has sent the instruction (normally, this is the third terminal apparatus 17). Then, the procedure returns to step S701.

(Step S706) The information accepting unit 137 determines whether information has been received from an external apparatus (normally, this is the third terminal apparatus 17). If information has been received, the procedure proceeds to step S707, and if not, the procedure proceeds to step S708.

(Step S707) The information accumulation unit 138 accumulates the information received in step S706 in a region corresponding to the information in the all-language group dictionary storage unit 131. Note that the information refers to, for example, reading, HMM, accent information, tone information and the like of a term, and is information usable for speech recognition, translation or speech synthesis. Also, the region corresponding to the information refers to the following. That is, the received information includes, for example, the language identifier and information identifying a term (the written form of the term, etc.) and added information (reading, HMM, accent information, tone information, etc. of the term). Then, the information accumulation unit 138 decides the region where the added information is to be written by using the language identifier and the information identifying the term, and accumulates the added information in that region. Then, the procedure returns to step S701.

(Step S708) The information-for-speech-recognition sending unit 132, the information-for-translation sending unit 133, or the information-for-speech-synthesis sending unit 134 determines whether it is time to send information. If it is time to send information, the procedure proceeds to step S714, and if not, the procedure proceeds to S709. Here, the information refers to information for speech recognition, information for translation, or information for speech synthesis. Also, the time to send information refers to, for example, when an instruction is accepted from a user. Furthermore, the sending destination of the information is stored in advance in the information-for-speech-recognition sending unit 132, the information-for-translation sending unit 133, or the information-for-speech-synthesis sending unit 134.

(Step S709) The written form acquiring unit 135 determines whether it is time to start crawling on the Web. If it is time to start crawling, the procedure proceeds to step S710, and if not, the procedure returns to step S701. Note that for example, the written form acquiring unit 135 regularly determines that it is time to start crawling.

(Step S710) The written form acquiring unit 135 crawls on the Web, and acquires the written forms of terms. Note that it is preferable that the written form acquiring unit 135 searches for updated web pages, compares the updated web pages with former web pages, extracts updated portions, and acquires terms (nouns, noun phrases, verbs, adjectives, and the like) from the updated portions. The written form of a term will be referred to as the "term" as appropriate. The technique of crawling will not be described in detail since it is well known. Furthermore, the written form acquiring unit 135 may acquire one term or may acquire a plurality of terms in this step.

(Step S711) The written form acquiring unit 135 searches the all-language group dictionary storage unit 131 by using each of the written forms of the one or more terms acquired in step S710 as the key.

(Step S712) The written form acquiring unit 135 determines, as a result of the search performed in step S711, whether each of the written forms of the one or more terms acquired in step S710 exists in the all-language group dictionary storage unit 131. If all of the written forms of terms exist, the procedure returns to step S701, and if not, the procedure proceeds to step S713.

(Step S713) The written form accumulation unit 136 accumulates, in the all-language group dictionary storage unit 131, one or more written forms of terms determined in step S712 to be not present in the all-language group dictionary storage unit 131. Note that the written form accumulation unit 136 accumulates each of the one or more written forms of the terms in a region corresponding to the language identifier that is associated with the written form of the term. Also, the written form acquiring unit 135 is assumed to acquire, when it acquires a term, the language identifier in association with that term. Then, the procedure returns to step S701.

(Step S714) The information-for-speech-recognition sending unit 132 determines whether it is time to send information for speech recognition. If it is time to send the information for speech recognition, the procedure proceeds to step S715, and if not, the procedure proceeds to step S717. The time to send the information for speech recognition refers to, for example, when an instruction is accepted from a user.

(Step S715) The information-for-speech-recognition sending unit 132 reads out information for speech recognition from the all-language group dictionary storage unit 131.

(Step S716) The information-for-speech-recognition sending unit 132 sends the information for speech recognition read out in step S715 to the one or more speech recognition servers 14. Note that the information for sending information to the one or more speech recognition servers 14 (e.g., IP address and URL) is assumed to be held in advance by the information-for-speech-recognition sending unit 132. Then, the procedure returns to step S701.

(Step S717) The information-for-translation sending unit 133 determines whether it is time to send information for translation. If it is time to send information for translation, the procedure proceeds to step S718, and if not, the procedure proceeds to step S720. Note that the time to send information for translation refers to, for example, when an instruction is accepted from a user.

(Step S718) The information-for-translation sending unit 133 reads out information for translation from the all-language group dictionary storage unit 131.

(Step S719) The information-for-translation sending unit 133 sends the information for translation read out in step S718 to the one or more translation servers 15. Note that the information for sending information to the one or more translation servers 15 (e.g., IP address and URL) is assumed to be held in advance by the information-for-translation sending unit 133. Then, the procedure returns to step S701.

(Step S720) The information-for-speech-synthesis sending unit 134 determines whether it is time to send information for speech synthesis. If it is time to send information for speech synthesis, the procedure proceeds to step S721, and if not, the procedure returns to step S701. Note that the time to send information for speech synthesis refers to, for example, when an instruction is accepted from a user.

(Step S721) The information-for-speech-synthesis sending unit 134 reads out information for speech synthesis from the all-language group dictionary storage unit 131.

(Step S722) The information-for-speech-synthesis sending unit 134 sends the information for speech synthesis read out in step S718 to the one or more speech synthesis servers 16. Note that the information for sending information to the one or more speech synthesis servers 16 (e.g., IP address and URL) is assumed to be held in advance by the information-for-speech-synthesis sending unit 134. Then, the procedure returns to step S701.

Note that in the flowchart shown in FIG. 7, the processing ends due to powering off or interruption for aborting the processing.

Next, an operation of the speech recognition server 14 will be described with reference to the flowchart in FIG. 8.

(Step S801) The speech information receiving unit 144 determines whether speech information has been received. If speech information has been received, the procedure proceeds to step S802, and if not, the procedure proceeds to step S809.

(Step S802) The speech recognition section 1453 performs speech recognition processing on the speech information received in step S801, and obtains a speech recognition result.

(Step S803) The speech recognition determination section 1451 determines whether the result of speech recognition performed in step S802 is a success or not. Here, for example, this determination is performed by using the likelihood of the speech recognition result. If the result is a success, the procedure proceeds to step S804, and if not, the procedure proceeds to step S805.

(Step S804) The speech recognition result sending unit 146 sends the speech recognition result acquired in step S802 to the translation server 15. Then, the procedure returns to step S801.

(Step S805) The speech recognition information sending instruction section 1452 acquires information to be sent to the dictionary server 13 in order to acquire information necessary to perform speech recognition on the speech information (speech recognition information). The acquired information refers to, for example, the speech information (this may be part of the speech information) speech recognition for which has failed, information that identifies the language (language identifier), and the like.

(Step S806) The speech recognition information sending instruction section 1452 sends an instruction including the information acquired in step S805 to the dictionary server 13. This instruction is an instruction to urge sending of speech recognition information.

(Step S807) The information-for-speech-recognition receiving unit 142 determines whether speech recognition information has been received in response to sending of the instruction in step S806. If the speech recognition information has been received, the procedure proceeds to step S808, and if not, the procedure returns to step S807.

(Step S808) The information-for-speech-recognition accumulation unit 143 accumulates the speech recognition information received in step S807 in the information-for-speech-recognition storage unit 141.

(Step S809) The speech recognition section 1453 performs speech recognition processing on the speech information received in step S801 by using the speech recognition information received in step S807, and acquires a speech recognition result. Then, the procedure proceeds to step S804.

(Step S810) The information-for-speech-recognition receiving unit 142 determines whether information for speech recognition with respect to all of the two or more languages, or at least two of the two or more languages has been received, from the dictionary server 13. If the information for speech recognition has been received, the procedure proceeds to S811, and if not, the procedure returns to step S801.

(Step S811) The information-for-speech-recognition accumulation unit 143 accumulates the information for speech recognition received in step S810 in the information-for-speech-recognition storage unit 141. Then, the procedure returns to step S801.

Note that in the flowchart shown in FIG. 8, the processing ends due to powering off or interruption for aborting the processing.

Next, an operation of the translation server 15 will be described with reference to the flowchart in FIG. 9.

(Step S901) The speech recognition result receiving unit 154 determines whether a speech recognition result has been received. If a speech recognition result has been received, the procedure proceeds to step S902, and if not, the procedure proceeds to step S909.

(Step S902) The translation section 1553 performs translation processing on the speech recognition result received in step S901, and obtains a translation result.

(Step S903) The translation determination section 1551 determines whether or not the result of the translation performed in step S902 is a success or not. Here, for example, this determination is performed using the likelihood of the translation result. If the result is a success, the procedure proceeds to step S904, and if not, the procedure proceeds to step S905.

(Step S904) The translation result sending unit 156 sends the translation result acquired in step S902 to the speech synthesis server 16. Then, the procedure returns to step S901.

(Step S905) The translation information sending instruction section 1552 acquires information to be sent to the dictionary server 13 in order to acquire information necessary to translate the speech recognition result (translation information). The acquired information is, for example, the speech recognition result (this may be part of the speech recognition result) for which translation has failed, the source language identifier, the target language identifier, and the like.

(Step S906) The translation information sending instruction section 1552 sends an instruction including the information acquired in step S905 to the dictionary server 13. This instruction is an instruction to urge sending of translation information.

(Step S907) The information-for-translation receiving unit 152 determines whether translation information has been received in response to sending of the instruction in step S906. If translation information has been received, the procedure proceeds to step S908, and if not, the procedure proceeds to step S907.

(Step S908) The information-for-translation accumulation unit 153 accumulates the translation information received in step S907 in the information-for-translation storage unit 151.

(Step S909) The translation section 1553 performs translation processing on the speech recognition result received in step S901 by using the translation information received in step S907, and obtains a translation result. Then, the procedure proceeds to step S904.

(Step S910) The information-for-translation receiving unit 152 determines whether information for translation with respect to all of the two or more languages, or at least two of the two or more languages has been received from the dictionary server 13. If the information for translation has been received, the procedure proceeds to step S911, and if not, the procedure returns to step S901.

(Step S911) The information-for-translation accumulation unit 153 accumulates the information for translation received in step S910 in the information-for-translation storage unit 151. Then, the procedure returns to step S901.

Note that in the flowchart shown in FIG. 9, the processing ends due to powering off or interruption for aborting the processing.

Next, an operation of the speech synthesis server 16 is described by using the flowchart in FIG. 10.

(Step S1001) The translation result receiving unit 164 determines whether a translation result has been received. If the translation result has been received, the procedure proceeds to step S1002, and if not, the procedure proceeds to step S1009.

(Step S1002) The speech synthesis section 1653 performs speech synthesis processing on the speech information received in step S1001 and obtains a speech synthesis result.

(Step S1003) The speech synthesis determination section 1651 determines whether a result of the speech synthesis performed in step S1002 is a success or not. Here, for example, this determination is performed by using the likelihood of the speech synthesis result. If the result is a success, the procedure proceeds to step S1004, and if not, the procedure proceeds to step S1005.

(Step S1004) The speech synthesis result sending unit 166 sends the speech synthesis result acquired in step S1002 to the second terminal apparatus 12. Then, the procedure returns to step S1001.

(Step S1005) The speech synthesis information sending instruction section 1652 acquires information to be sent to the dictionary server 13 in order to acquire information necessary to perform speech synthesis on the translation result (speech synthesis information). The acquired information is, for example, the translation result (this may be part of the translation result) for which speech synthesis has failed and the target language identifier.

(Step S1006) The speech synthesis information sending instruction section 1652 sends an instruction including the information acquired in step S1005 to the dictionary server 13. This instruction is an instruction to urge sending of speech synthesis information.

(Step S1007) The information-for-speech-synthesis receiving unit 162 determines whether speech synthesis information has been received in response to sending of the instruction in step S1006. If the speech synthesis information has been received, the procedure proceeds to step S1008, and if not, the procedure proceeds to step S1007.

(Step S1008) The information-for-speech-synthesis accumulation unit 163 accumulates the speech synthesis information received in step S1007 in the information-for-speech-synthesis storage unit 161.

(Step S1009) The speech synthesis section 1653 performs speech synthesis processing on the translation result received in step S1001 by using the speech synthesis information received in step S1007, and obtains a speech synthesis result. Then, the procedure proceeds to step S1004.

(Step S1010) The information-for-speech-synthesis receiving unit 162 determines whether information for speech synthesis with respect to all of the two or more languages, or at least two of the two or more languages has been received from the dictionary server 13. If the information for speech synthesis has been received, the procedure proceeds to step S1011, and if not, the procedure returns to step S1001.

(Step S1011) The information-for-speech-synthesis accumulation unit 163 accumulates the information for speech synthesis received in step S1010 in the information-for-speech-synthesis storage unit 161. Then, the procedure returns to step S1001.

Note that in the flowchart shown in FIG. 10, the processing ends due to powering off or interruption for aborting the processing.

Next, an operation of the third terminal apparatus 17 will be described. The input accepting unit 171 of the third terminal apparatus 17 accepts an input of various types of instructions and information from the user. For example, the input accepting unit 171 accepts an instruction to output the all-language group dictionary from the user. Then, the input information sending unit 174 sends the output instruction accepted by the input accepting unit 171 to the dictionary server 13. Then, the information receiving unit 172 receives the whole or part of the all-language group dictionary from the dictionary server 13 in response to sending of the output instruction. Next, the information output unit 173 outputs the whole or part of the all-language group dictionary received by the information receiving unit 172. Note that when the output is performed, the information output unit 173 outputs the received information (the all-language term information or part of the all-language term information) in visually different manners between the case where all the predetermined information exists with respect to all of the two or more languages, and the case where part of the predetermined information is missing. That is, the whole or part of the all-language group dictionary (information of one or more terms) is output so as to expressly notify the user, with respect to a term whose information is partially missing, that the information is partially missing.

Also, the input accepting unit 171 accepts an input for information that is missing in the all-language group dictionary from the user. Then, the input information sending unit 174 sends the information accepted by the input accepting unit 171 to the dictionary server 13. Then, such information is accumulated in the all-language group dictionary. In this manner, the all-language group dictionary is improved.

Hereinafter, a specific operation of the speech translation system 1 of the present embodiment will be described. The conceptual diagram of the speech translation system 1 is as shown in FIG. 1.

Now, the all-language group dictionary storage unit 131 of the dictionary server 13 has stored therein the all-language group dictionary shown in FIG. 11. The all-language group dictionary of FIG. 11 has a structure described below in order to solve the problem of inconsistency among dictionaries in speech translation. The all-language group dictionary is information that integrally manages information necessary for the speech recognition dictionary, the dictionary for translation, and the dictionary for speech synthesis in association with each other with respect to all languages. Specifically, the all-language group dictionary is assumed to include the following structure information: "Japanese <written form><reading><acoustic model><accent> . . . ", "English <written form><reading><acoustic model><accent><tone> . . . ", "Chinese <written form><reading><acoustic model><accent><tone> . . . ", "German<written form><reading><acoustic model><accent><flag information> . . . ", for example. The all-language group dictionary has term information for each language corresponding to the structure information. In FIG. 11, the term information for Japanese with respect to the term "大阪" is "<written form>大阪<reading>おおさか<acoustic model> . . . <accent>4 moras type 0 . . . ". Note that the information between the angle brackets (< and >) indicates element (attribute) in the dictionary, and the information group between the angle brackets (< and >) constitutes the structure information referred to here.

In this situation, first, it is assumed that the information-for-speech-recognition sending unit 132 of the dictionary server 13 has determined that it is time to send information for speech recognition upon instruction from a user.

Then, the information-for-speech-recognition sending unit 132 reads out, from the all-language group dictionary storage unit 131, information for speech recognition (this is the same as the speech recognition dictionary) shown in FIG. 12. The speech recognition dictionary includes, for each term, information such as "written form" and "acoustic model" for each language.

Next, the information-for-speech-recognition sending unit 132 sends the read-out speech recognition dictionary to the one or more speech recognition servers 14.

Next, the information-for-speech-recognition receiving unit 142 of each of the one or more speech recognition servers 14 receives the speech recognition dictionary from the dictionary server 13.

Then, the information-for-speech-recognition accumulation unit 143 accumulates the received speech recognition dictionary (information for speech recognition) in the information-for-speech-recognition storage unit 141.

Also, upon instruction from the user, the information-for-translation sending unit 133 of the dictionary server 13 determines that it is time to send information for translation.

Then, the information-for-translation sending unit 133 reads out, from the all-language group dictionary storage unit 131, information for translation (this is the same as the translation dictionary) shown in FIG. 13. The translation dictionary includes, for each term, information such as "written form" for each language.

Next, the information-for-translation sending unit 133 sends the read-out translation dictionary to the one or more translation servers 15.

Next, the information-for-translation receiving unit 152 of each of the one or more translation servers 15 receives the translation dictionary from the dictionary server 13.

Then, the information-for-translation accumulation unit 153 accumulates the received translation dictionary (information for translation) in the information-for-translation storage unit 151.

Furthermore, the information-for-speech-synthesis sending unit 134 determines that it is time to send information for speech synthesis.

Next, the information-for-speech-synthesis sending unit 134 reads out, from the all-language group dictionary storage unit 131, information for speech synthesis (this is the same as the speech synthesis dictionary) shown in FIG. 14. The speech synthesis dictionary includes, for each term, information pieces such as "written form", "reading" and "accent" for each language.

Next, the information-for-speech-synthesis sending unit 134 sends the read-out speech synthesis dictionary to the one or more speech synthesis servers 16.

Then, the information-for-speech-synthesis receiving unit 162 receives the speech synthesis dictionary from the dictionary server 13.

Then, the information-for-speech-synthesis accumulation unit 163 accumulates the received speech synthesis dictionary (information for speech synthesis) in the information-for-speech-synthesis storage unit 161.

By the processing described above, the speech recognition servers 14, the translation servers 15 and the speech synthesis servers 16 each have stored therein consistent dictionaries, which enables, generally, performing speech translation without problem. However, dictionaries stored in the speech recognition servers 14, the translation servers 15 and the speech synthesis servers 16 may be independently expanded, and as a result, may become inconsistent.

Next, it is assumed that in a state where dictionaries necessary for speech recognition, translation, and speech synthesis are created respectively in the speech recognition server 14, the translation server 15, and the speech synthesis server 16, the user A of the first terminal apparatus 11 and the user B of the second terminal apparatus 12 talk on the phone by using a speech translation system. Note that the user A speaks, for example, Japanese, and the user B speaks, for example, English.

Then, the first terminal apparatus 11 is assumed to hold the speech translation control information shown in FIG. 15. Furthermore, the second terminal apparatus 12 is assumed to hold the speech translation control information shown in FIG. 16. The speech translation control information includes, for example, information of the source language uttered by the user (here, information of <source language>), information of the target language uttered by the other party (here, information of <target language>), information for communicating with the speech recognition server 14 (here, information of <speech recognition server>), information for communicating with the translation server 15 (here, information of <translation server>), information for communicating with the speech synthesis server 16 (here, information of <speech synthesis server>), an identifier of the second terminal apparatus 12 or the first terminal apparatus 11 (here, information of <other party's terminal>), and an identifier of the first terminal apparatus 11 or the second terminal apparatus 12 (here, information of <own terminal>). Note that information of <speech recognition server>, <translation server>, and <speech synthesis server> is IP addresses of the corresponding apparatuses in this case, but naturally this can be other information such as URLs or telephone numbers. Also, although information of <other party's terminal> and <own terminal> is telephone numbers in this case, naturally, this can be other information such as IP addresses or MAC addresses.

Then, it is assumed that the user A said "大阪" toward the first terminal apparatus 11 during conversation.

Next, the first terminal apparatus 11 configures speech information of "大阪 大阪". The first terminal apparatus 11 reads out the speech translation control information shown in FIG. 15, and sends the speech information of "大阪" and the speech translation control information shown in FIG. 15 to the speech recognition server 14 identified by "<speech recognition server>186.221.1.27".

Next, the speech recognition server 14 receives the speech information of "大阪" and the speech translation control information shown in FIG. 15.

Next, the speech recognition section 1453 of the speech recognition server 14 acquires "<source language>Japanese" in the speech translation control information shown in FIG. 15. Then, the speech recognition section 1453 performs speech recognition processing on the received speech information of "大阪 大阪" by using the acoustic model for Japanese (see FIG. 12), and obtains a speech recognition result (including the character string "大阪").

Next, the speech recognition determination section 1451 determines whether the likelihood of the speech recognition result is greater than or equal to a predetermined threshold (whether speech recognition has succeeded). Here, it is assumed that speech recognition has succeeded.

Next, the speech recognition result sending unit 146 sends the acquired speech recognition result to the translation server 15 identified by "<translation server>225.68.21.129" in the speech translation control information shown in FIG. 15. Also, the speech recognition result sending unit 146 sends the speech translation control information shown in FIG. 15 as well to the translation server 15 identified by "<translation server>225.68.21.129".

Next, the speech recognition result receiving unit 154 of the translation server 15 receives the speech recognition result (including "大阪") and the speech translation control information.

Next, the translation section 1553 reads out "<source language>Japanese" and "<target language>English" in the speech translation control information.

Then, the translation section 1553 determines that the speech recognition result (including "大阪") is Japanese, and reads out the term "Osaka" of "<target language>English" that is associated with the term "大阪" from the translation dictionary shown in FIG. 13. Then, the translation section 1553 obtains the translation result "Osaka".

Next, the translation determination section 1551 determines that the translation result is a success since the term corresponding to "<target language>English" could be retrieved from the translation dictionary.

Next, the translation result sending unit 156 sends the acquired translation result "Osaka" and the speech translation control information shown in FIG. 15 to the speech synthesis server 16 identified by "<speech synthesis server>56.72.128.202".

Next, the translation result receiving unit 164 of the speech synthesis server 16 receives the translation result "Osaka" and the speech translation control information shown in FIG. 15.

Then, the speech synthesis section 1653 reads out "<target language>English" from the speech translation control information.

Next, the speech synthesis section 1653 reads out speech synthesis information (reading, accent, and the like) corresponding to the term "Osaka" and "<target language>English" from the speech synthesis dictionary in FIG. 14.

Next, the speech synthesis section 1653 performs speech synthesis processing using the read-out speech synthesis information, and obtains a speech synthesis result.

Next, the speech synthesis determination section 1651 determines that the result of the speech synthesis is a success since the likelihood of the speech synthesis result is greater than or equal to a predetermined threshold.

Next, the speech synthesis result sending unit 166 sends the acquired speech synthesis result to the second terminal apparatus 12 identified by "<other party's terminal>090-1445-1122".

Next, the second speech receiving unit 123 of the second terminal apparatus 12 receives the speech in English (speech of "Osaka") obtained by performing speech translation on the speech in Japanese "大阪" uttered by the user A.

Then, the second speech output unit 124 outputs the speech (speech of "Osaka") received by the second speech receiving unit 123.

By the processing described above, speech translation is realized. Also, the speech translation control information shown in FIG. 16 is used for a speech uttered by the user B to be translated and reach the user A. The procedure of the speech translation is the same as that described above.

Also, if processing has failed in any of speech recognition, translation, and speech synthesis processing, the speech recognition server 14, the translation server 15, or the speech synthesis server 16 performs a query to the dictionary server 13 in real-time such that necessary information is sent back. Then, the speech recognition server 14, the translation server 15, or the speech synthesis server 16, after having received information necessary for the corresponding processing from the dictionary server 13, advances the speech recognition, translation or speech synthesis processing, as described above.

In addition, it is assumed that the written form acquiring unit 135 of the dictionary server 13 has determined that it is time to start crawling on the Web.

Then, it is assumed that the written form acquiring unit 135 crawls on the Web and acquires a written form "名古屋" of a term "名古屋", for example. Then, the written form acquiring unit 135 searches the all-language group dictionary by using the written form "名古屋" of the acquired term as the key. It is assumed that as a result of the search, the written form acquiring unit 135 has determined that the written form "名古屋" of the acquired term does not exist in the all-language group dictionary.

Next, the written form accumulation unit 136 accumulates, in the all-language group dictionary, the written form "名古屋" of the term that has been determined to be not present in the all-language group dictionary. As a result, the all-language group dictionary is, for example, as shown in FIG. 17. FIG. 17 shows a state in which only the written form is present for the term "名古屋", and its reading, acoustic model and the like are not present.

It is assumed that in this state, the input accepting unit 171 of the third terminal apparatus 17 has accepted an instruction to output the all-language group dictionary from a user.

Next, the input information sending unit 174 sends the output instruction accepted by the input accepting unit 171 to the dictionary server 13.

Next, the dictionary server 13 receives an output instruction. Then, the output unit 139 retrieves information corresponding to the output instruction from the all-language group dictionary, and sends the information acquired by the search to the apparatus that has sent the instruction (normally, this is the third terminal apparatus 17).

Next, the information receiving unit 172 of the third terminal apparatus 17 receives part of the all-language group dictionary from the dictionary server 13 in response to sending of the output instruction.

Next, the information output unit 173 outputs the part of the all-language group dictionary received by the information receiving unit 172. An example output is shown in FIG. 18. In FIG. 18, information is output in visually different manners between the case where all the predetermined information exists with respect to all of the two or more languages (the term "大阪"), and the case where part of the predetermined information is missing (the term "名古屋"). In FIG. 18, the fields (cells) having no data are hatched. This is for urging the user of the third terminal apparatus 17 to input missing information.

Then, the user inputs, for example, "なごや", which is the reading of the term "名古屋", its acoustic model in Japanese, the written form, reading and the like in Korean, and the written form, reading and the like in English of the term "名古屋". Next, the input accepting unit 171 accepts an input from the user.

Next, the input information sending unit 174 of the third terminal apparatus 17 sends the information accepted by the input accepting unit 171 to the dictionary server 13.

Next, the information accepting unit 137 of the dictionary server 13 accepts, from the third terminal apparatus 17, a plurality of information pieces of the term information ("なごや", which is the reading of the term "名古屋", its acoustic model in Japanese, the written form, reading and the like in Korean, or the written form, reading and the like in English of the term "名古屋").

Then, the information accumulation unit 138 accumulates the information accepted by the information accepting unit 137 in association with the written form of the term corresponding to the information in the language corresponding to the information.

By the processing described above, the all-language group dictionary of the dictionary server 13 is improved.

As described above, with the present embodiment, it is possible to prevent inconsistency among dictionaries, such as the state in which a term present in any of the speech recognition dictionary, the translation dictionary and the speech synthesis dictionary used in speech translation is not present in other dictionaries, for example. As a result, speech translation is performed without problem.

Also, in the present embodiment, if processing fails in any of speech recognition, translation, or speech synthesis processing, the speech recognition server 14, the translation server 15, or the speech synthesis server 16 can perform a query to the dictionary server 13 in real-time, such that necessary information is sent back. As a result, speech translation is carried out at a quite high possibility.

In addition, with the present embodiment, the all-language group dictionary of the dictionary server 13 can be improved by crawling on the Web, or accepting inputs of information from users, for example. Therefore, it may be possible to perform speech translation on various terms including new terms.

Note that in the present embodiment, the speech recognition unit 145 has been described as including, mainly, the speech recognition determination section 1451, the speech recognition information sending instruction section 1452 and the speech recognition section 1453. However, it is not necessary for the speech recognition unit 145 to include the speech recognition determination section 1451 and the speech recognition information sending instruction section 1452. In this case, it is assumed that the speech recognition unit 145 does not fail in speech recognition processing. Also, in the present embodiment, the translation unit 155 has been described as including, mainly, the translation determination section 1551, the translation information sending instruction section 1552 and the translation section 1553. However, it is not necessary for the translation unit 155 to include the translation determination section 1551 and the translation information sending instruction section 1552. In this case, it is assumed that the translation unit 155 does not fail in translation processing. In addition, the speech synthesis unit 165 has been described as including the speech synthesis determination section 1651, the speech synthesis information sending instruction section 1652, and the speech synthesis section 1653. However, it is not necessary for the speech synthesis unit 165 to include the speech synthesis determination section 1651 and the speech synthesis information sending instruction section 1652. In this case, it is assumed that the speech synthesis unit 165 does not fail in speech synthesis processing. In this case, the speech translation system 1 of the present embodiment is a speech translation system including a dictionary server, one or more speech recognition servers, one or more translation servers, and one or more speech synthesis servers, wherein the dictionary server includes: an all-language group dictionary storage unit capable of having stored therein two or more pieces of all-language term information, each piece of all-language term information including term information with respect to each of two or more languages, each term information including a written form of a term that has one or more words, speech recognition information for performing speech recognition on the term, and speech synthesis information for performing speech synthesis on the term, the term information being associated with each other with respect to all of the two or more languages; an information-for-speech-recognition sending unit that acquires, from the all-language group dictionary storage unit, information for speech recognition that includes speech recognition information of the term with respect to all of the two or more languages, or at least two of the two or more languages, and sends the information for speech recognition to the one or more speech recognition servers; an information-for-translation sending unit that acquires, from the all-language group dictionary storage unit, information for translation that includes the written form of the term with respect to all of the two or more languages, or at least two of the two or more languages, and sends the information for translation to the one or more translation servers; and an information-for-speech-synthesis sending unit that acquires, from the all-language group dictionary storage unit, information for speech synthesis that includes speech synthesis information of the term with respect to all of the two or more languages, or at least two of the two or more languages, and sends the information for speech synthesis to the one or more speech synthesis servers, each speech recognition server includes: an information-for-speech-recognition storage unit capable of having stored therein information for speech recognition with respect to all of the two or more languages, or at least two of the two or more languages; an information-for-speech-recognition receiving unit that receives, from the dictionary server, information for speech recognition with respect to all of the two or more languages, or at least two of the two or more languages; an information-for-speech-recognition accumulation unit that accumulates the information for speech recognition received by the information-for-speech-recognition receiving unit in the information-for-speech-recognition storage unit; a speech information receiving unit that receives speech information that is information of speech input to a first terminal apparatus; a speech recognition unit that performs speech recognition on the speech information received by the speech information receiving unit by using information for speech recognition in the information-for-speech-recognition storage unit, and acquires a speech recognition result; and a speech recognition result sending unit that sends the speech recognition result, each translation server includes: an information-for-translation storage unit capable of having stored therein information for translation with respect to all of the two or more languages, or at least two of the two or more languages; an information-for-translation receiving unit that receives, from the dictionary server, information for sound translation with respect to all of the two or more languages, or at least two of the two or more languages; an informationfor-translation accumulation unit that accumulates the information for translation received by the information-for-translation receiving unit in the information-for-translation storage unit; a speech recognition result receiving unit that receives the speech recognition result; a translation unit that translates the speech recognition result received by the speech recognition result receiving unit into a target language by using information for translation in the information-for-translation storage unit, and acquires a translation result; and a translation result sending unit that sends the translation result, each speech synthesis server includes: an information-for-speech-synthesis storage unit capable of having stored therein information for speech synthesis with respect to all of the two or more languages, or at least two of the two or more languages; an information-for-speech-synthesis receiving unit that receives, from the dictionary server, information for speech synthesis with respect to all of the two or more languages, or at least two of the two or more languages; an information-for-speech-synthesis accumulation unit that accumulates the information for speech synthesis received by the information-for-speech-synthesis receiving unit in the information-for-speech-synthesis storage unit; a translation result receiving unit that receives the translation result; a speech synthesis unit that performs speech synthesis on the translation result received by the translation result receiving unit by using information for speech synthesis in the information-for-speech-synthesis storage unit, and acquires a speech synthesis result; and a speech synthesis result sending unit that sends the speech synthesis result to a second terminal apparatus.

Furthermore, the processing in the present embodiment may be realized by software. Such software may be distributed by downloading of software product or the like. In addition, such software may be recorded on a recording medium such as a CD-ROM and distributed. Note that this applies to other embodiments of the invention as well. Software that realizes a dictionary server of the present embodiment may be a program as described below. That is, this program, while allowing storage in a storage medium of two or more pieces of all-language term information, each piece of all-language term information including term information with respect to each of two or more languages, each term information including a written form of a term that has one or more words, speech recognition information for performing speech recognition on the term, and speech synthesis information for performing speech synthesis on the term, the term information being associated with each other with respect to all of the two or more languages, causes a computer to function as an information-for-speech-recognition sending unit that acquires, from the storage medium, information for speech recognition that includes speech recognition information of the term with respect to all of the two or more languages, or at least two of the two or more languages, and sends the information for speech recognition to the one or more speech recognition servers, an information-for-translation sending unit that acquires, from the storage medium, information for translation that includes the written form of the term with respect to all of the two or more languages, or at least two of the two or more languages, and sends the information for translation to the one or more translation servers, and an information-for-speech-synthesis sending unit that acquires, from the storage medium, information for speech synthesis that includes speech synthesis information of the term with respect to all of the two or more languages, or at least two of the two or more languages, and sends the information for speech synthesis to the one or more speech synthesis servers.

Also, with the program, it is preferable that the program further causes the computer to function as a written form acquiring unit that acquires a written form of a term that does not exist in the storage medium from web pages on one or more web servers on the Internet and a written form accumulation unit that accumulates the written form of the term acquired by the written form acquiring unit in the storage medium.

Also, with the program, it is preferable that the program further causes the computer to function as an information accepting unit that accepts any information of the term information from one or more third terminal apparatuses and an information accumulation unit that accumulates the information accepted by the information accepting unit in the storage medium in association with the written form of the term corresponding to the information accepted by the information accepting unit in a language corresponding to the information accepted by the information accepting unit.

Also, with the program, it is preferable that the program causes the computer to function as an output unit that outputs the all-language term information or part of the all-language term information, and causes the computer to function such that in a case where the output unit outputs the all-language term information or part of the all-language term information, the output unit outputs the all-language term information or part of the all-language term information in visually different manners between a case where all predetermined information exists with respect to all of the two or more languages, and a case where part of the predetermined information is missing.

Also, software that realizes the speech recognition server of the present embodiment is a program as described below. That is, this program, while allowing storage in a storage medium of information for speech recognition with respect to all of the two or more languages, or at least two of the two or more languages, causes a computer to function as an information-for-speech-recognition receiving unit that receives, from the dictionary server, information for speech recognition with respect to all of the two or more languages, or at least two of the two or more languages, an information-for-speech-recognition accumulation unit that accumulates the information for speech recognition received by the information-for-speech-recognition receiving unit in the storage medium, a speech information receiving unit that receives speech information that is information of speech input to a first terminal apparatus, a speech recognition unit that performs speech recognition on the speech information received by the speech information receiving unit by using information for speech recognition in the storage medium, and acquires a speech recognition result, and a speech recognition result sending unit that sends the speech recognition result.

With the program, it is preferable that the program causes the computer to function such that the speech recognition unit includes: a speech recognition determination section that determines whether speech recognition processing performed on the speech information received by the speech information receiving unit has succeeded or failed; a speech recognition information sending instruction section that issues, to the dictionary server, an instruction to send speech recognition information in a case where the speech recognition determination section has determined that the speech recognition processing has failed; and a speech recognition section that performs speech recognition on the speech information received by the speech information receiving unit by using information for speech recognition in the storage medium, and acquires a speech recognition result, and also performs speech recognition by using speech recognition information that the information-for-speech-recognition receiving unit has received from the dictionary server in response to sending of the instruction, and acquires a speech recognition result, and the information-for-speech-recognition receiving unit receives the speech recognition information from the dictionary server in response to sending of the instruction.

Also, software that realizes the translation server of the present embodiment is a program as described below. That is, this program, while allowing storage in a storage medium of information for translation with respect to all of the two or more languages, or at least two of the two or more languages, causes a computer to function as an information-for-translation receiving unit that receives, from the dictionary server, information for sound translation with respect to all of the two or more languages, or at least two of the two or more languages, an information-for-translation accumulation unit that accumulates the information for translation received by the information-for-translation receiving unit in the storage medium, a speech recognition result receiving unit that receives the speech recognition result, a translation unit that translates the speech recognition result received by the speech recognition result receiving unit into a target language by using information for translation in the storage medium, and acquires a translation result, and a translation result sending unit that sends the translation result.

With the program, it is preferable that the program causes the computer to function such that the translation unit includes: a translation determination section that determines whether translation processing performed on the speech recognition result received by the speech recognition result receiving unit has succeeded or failed; a translation information sending instruction section that issues, to the dictionary server, an instruction to send the written form of the term in the target language in a case where the translation determination section has determined that the translation processing has failed; and a translation section that translates the speech recognition result received by the speech recognition result receiving unit into the target language by using information for translation in the storage medium, and acquires a translation result, and also translates the speech recognition result into the target language by using the written form of the term in the target language that the information-for-translation receiving unit has received from the dictionary server in response to sending of the instruction, and acquires a translation result, wherein the information-for-translation receiving unit receives the written form of the term in the target language from the dictionary server in response to sending of the instruction.

Also, software that realizes the speech synthesis server of the present embodiment is a program as described below. That is, this program, while allowing storage in a storage medium of information for speech synthesis with respect to all of the two or more languages, or at least two of the two or more languages, causes a computer to function as an information-for-speech-synthesis receiving unit that receives, from the dictionary server, information for speech synthesis with respect to all of the two or more languages, or at least two of the two or more languages, an information-for-speech-synthesis accumulation unit that accumulates the information for speech synthesis received by the information-for-speech-synthesis receiving unit in the storage medium, a translation result receiving unit that receives the translation result, a speech synthesis unit that performs speech synthesis on the translation result received by the translation result receiving unit by using information for speech synthesis in the storage medium, and acquires a speech synthesis result, and a speech synthesis result sending unit that sends the speech synthesis result to a second terminal apparatus.

With the program, it is preferable that the program causes the computer to function such that the speech synthesis unit includes: a speech synthesis determination section that determines whether speech synthesis processing performed on the translation result received by the translation result receiving unit has succeeded or failed; a speech synthesis information sending instruction section that issues, to the dictionary server, an instruction to send speech synthesis information in a case where the speech synthesis determination section has determined that the speech synthesis processing has failed; and a speech synthesis section that performs speech synthesis on the translation result received by the translation result receiving unit by using information for speech synthesis in the storage medium, and acquires a speech synthesis result, and also performs speech synthesis on the translation result by using the speech synthesis information that the information-for-speech-synthesis receiving unit has received from the dictionary server in response to sending of the instruction, and acquires a speech synthesis result, and the information-for-speech-synthesis receiving unit receives the speech synthesis information from the dictionary server in response to sending of the instruction.

Also, FIG. 19 shows the external appearance of a computer that realizes the speech translation system and the like in the foregoing embodiments by executing the program described in this specification. The foregoing embodiments may be realized using computer hardware and a computer program executed thereon. FIG. 19 is a schematic diagram of a computer system 340, and FIG. 20 is a block diagram of the computer system 340.

In FIG. 19, the computer system 340 includes a computer 341 including an FD drive and a CD-ROM drive, a keyboard 342, a mouse 343, and a monitor 344.

In FIG. 20, the computer 341 includes not only the FD drive 3411 and the CD-ROM drive 3412, but also an MPU 3413, a bus 3414 that is connected to the CD-ROM drive 3412 and the FD drive 3411, a ROM 3415 in which a program such as a startup program is to be stored, a RAM 3416 that is connected to the ROM 3415 and in which a command of an application program is temporarily stored and by which a temporary storage area is provided, and a hard disk 3417 in which an application program, a system program, and data are to be stored. Although not shown, the computer 341 may further include a network card that provides connection to a LAN.

The program for causing the computer system 340 to execute the functions of the speech recognition or the like in the foregoing embodiments may be stored in a CD-ROM 3501 or an FD 3502, which are inserted into the CD-ROM drive 3412 or the FD drive 3411, and may be transmitted to the hard disk 3417. Alternatively, the program may be transmitted to the computer 341 via a network (not shown) and stored in the hard disk 3417. At the time of execution, the program is loaded into the RAM 3416. The program may be loaded from the CD-ROM 3501 or the FD 3502, or directly from the network.

The program does not necessarily have to include, for example, an operating system (OS), a third party program, or the like to cause the computer 341 to execute the functions of the speech recognition and the like in the above-described embodiments. The program may only include a portion of commands capable of calling an appropriate function (module) in a controlled mode and obtaining the desired results. The manner in which the computer system 340 operates is well known, and, thus, a detailed description thereof is omitted.

It should be noted that, in the program, a process performed by hardware, for example, a process performed by a modem or an interface card in the step of sending (a process that can be performed only by such hardware) is not included in the step of sending information, the step of receiving information, and the like.

Furthermore, the computer that executes this program may be a single computer, or may be multiple computers. More specifically, centralized processing may be performed, or distributed processing may be performed.

Furthermore, in the foregoing embodiments, needless to say, two or more communication means (the speech information receiving unit and the information-for-speech-recognition receiving unit, for example) provided in a single apparatus may be realized by a physically single medium.

Furthermore, in the foregoing embodiments, each process (each function) may be realized as an integrated process using a single apparatus (system), or may be realized as a distributed process using multiple apparatuses.

The present invention is not limited to the embodiments set forth herein, and various modifications are possible. Needless to say, such modifications are also embraced in the scope of the present invention.

Industrial Applicability

As described above, the speech translation system of the present invention has an effect of eliminating inconsistency among dictionaries used in speech translation, and is useful as a speech translation system, for example.

BRIEF DESCRIPTION OF THE DRAWINGS

FIG. 11 shows an all-language group dictionary of Embodiment 1.

FIG. 12 shows a speech recognition dictionary of Embodiment 1.

FIG. 13 shows a translation dictionary of Embodiment 1.

FIG. 14 shows a speech synthesis dictionary of Embodiment 1.

FIG. 15 shows speech translation control information of Embodiment 1.

FIG. 16 shows another speech translation control information of Embodiment 1.

FIG. 17 is an all-language group dictionary of Embodiment 1.

Figure 1:
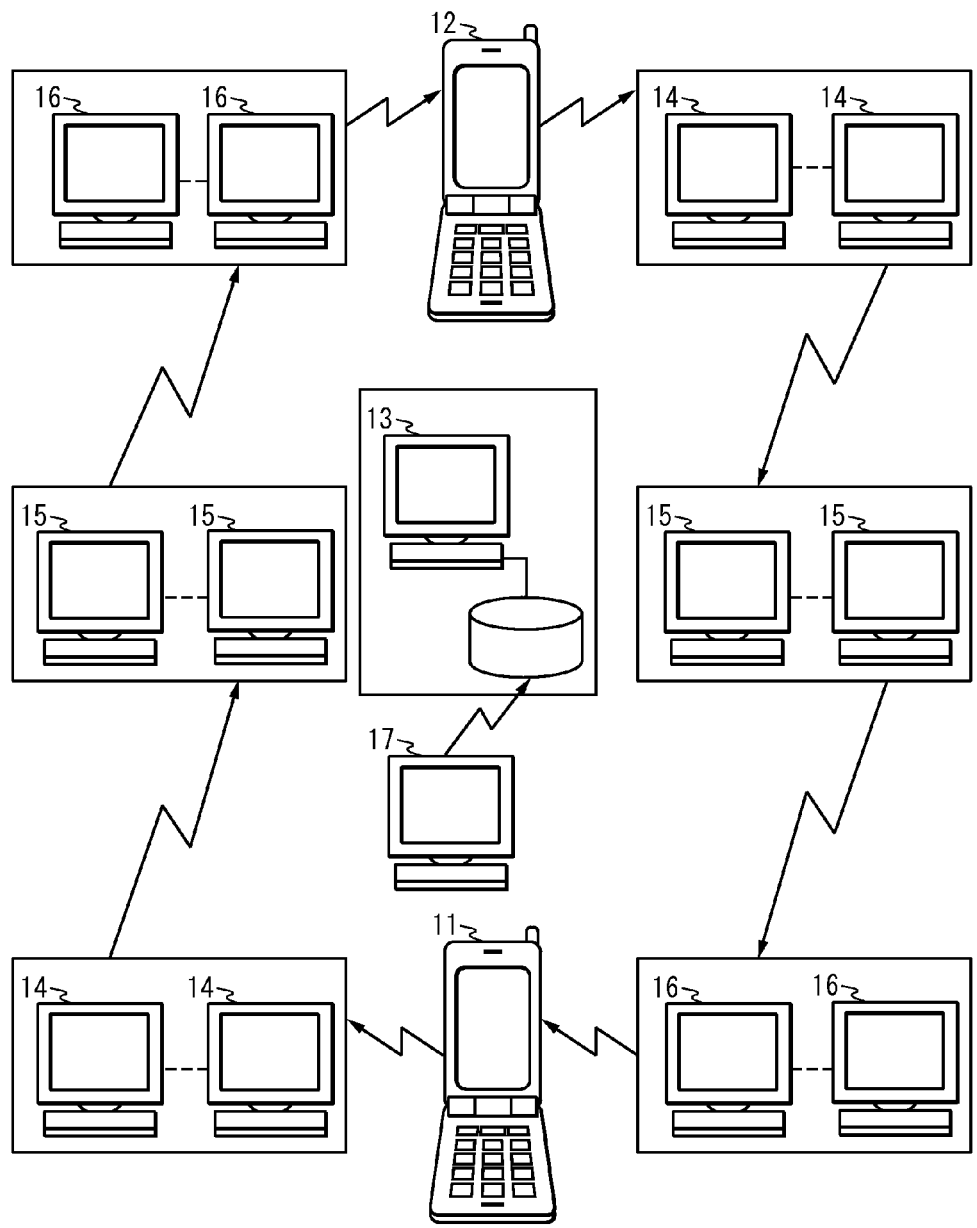
FIG. 1 is a conceptual diagram of a speech translation system of Embodiment 1.
Figure 2:
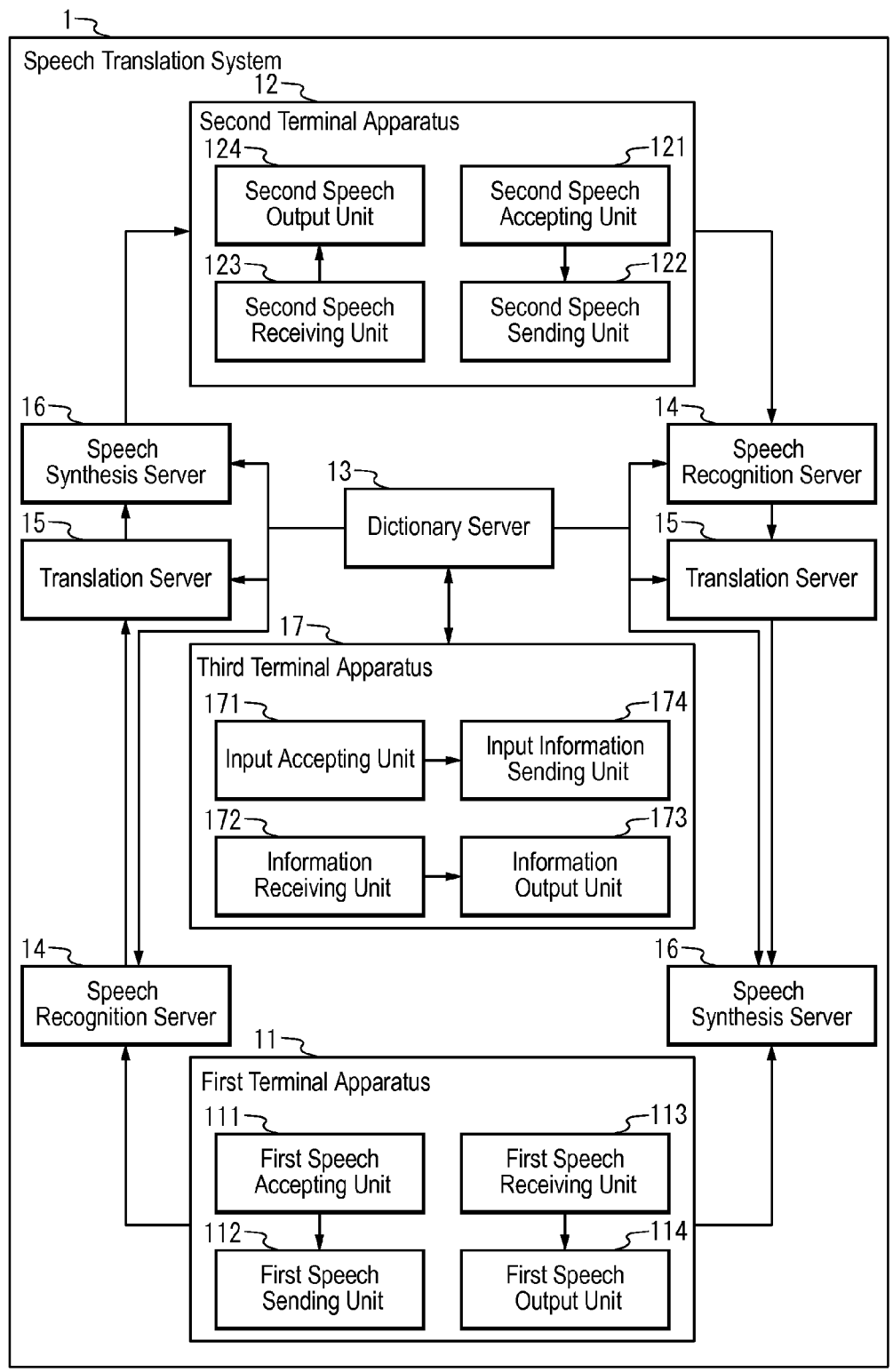
FIG. 2 is a block diagram of the speech translation system of Embodiment 1.
Figure 3:
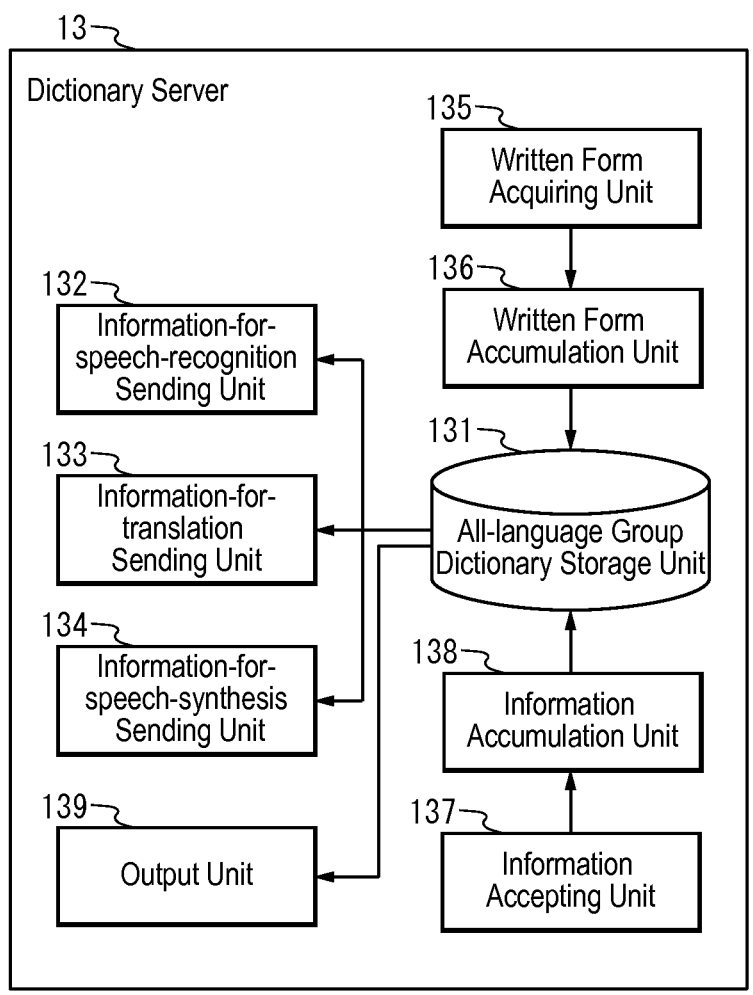
FIG. 3 is a block diagram of a dictionary server of Embodiment 1.
Figure 4:
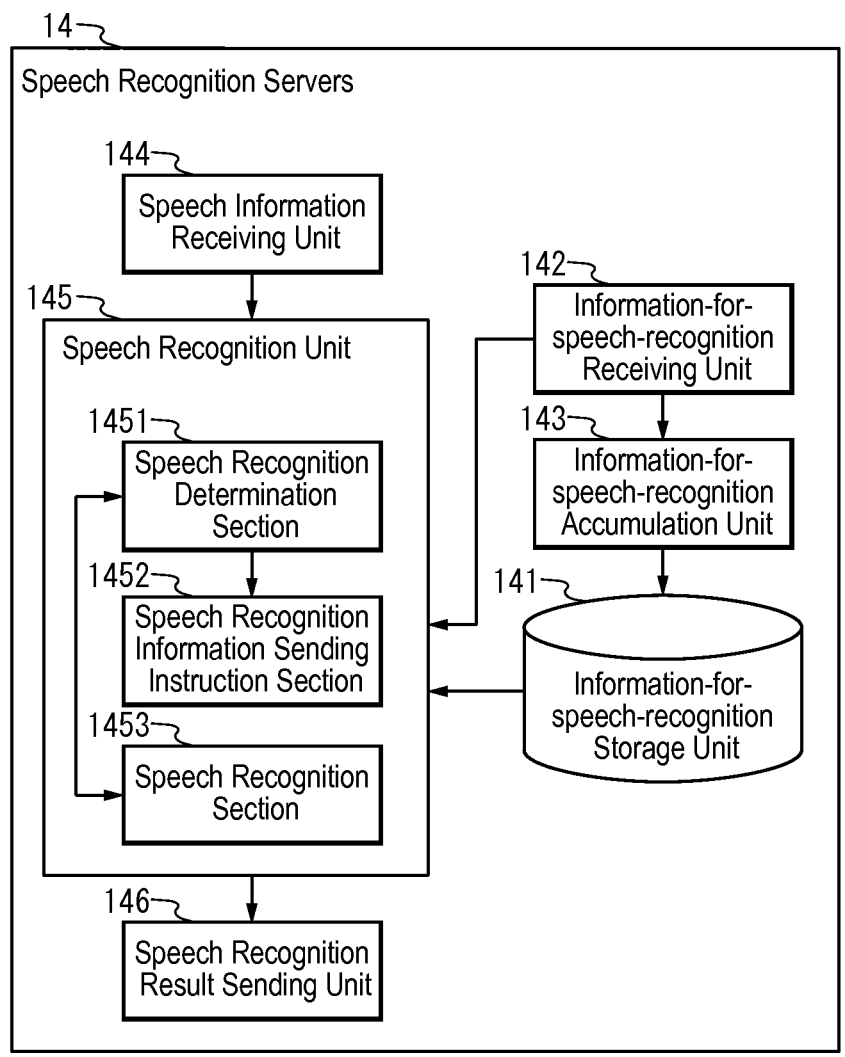
FIG. 4 is a block diagram of a speech recognition server of Embodiment 1.
Figure 5:
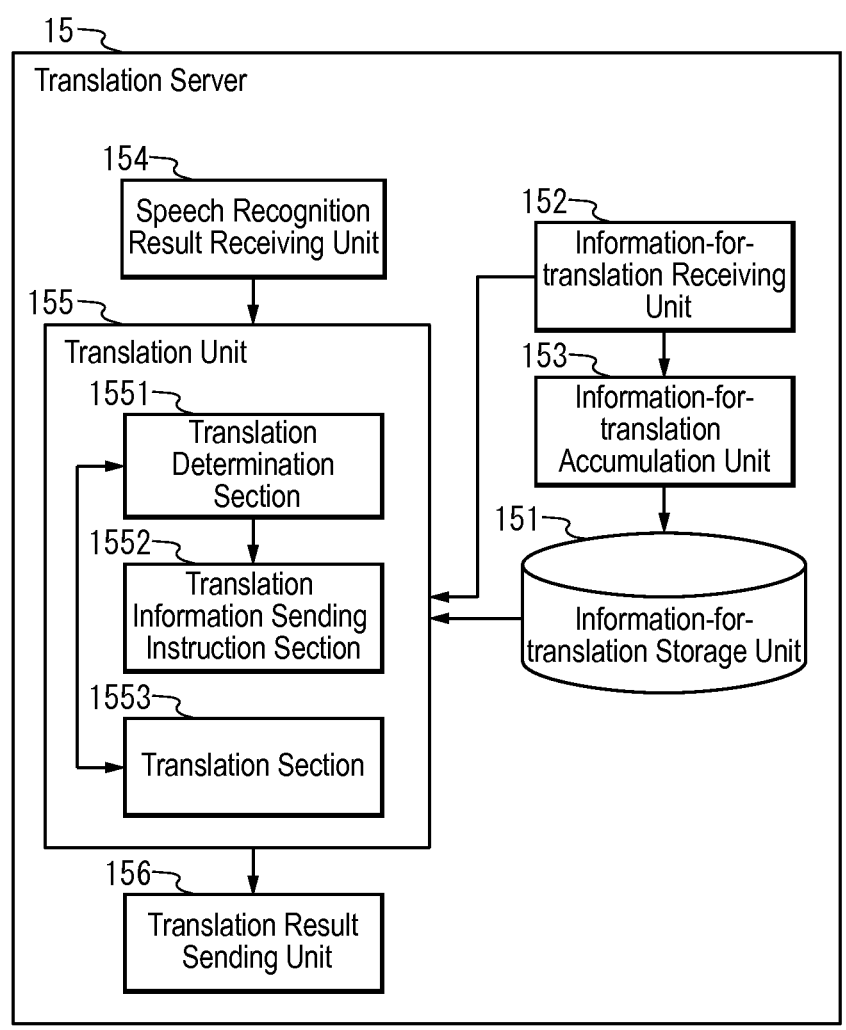
FIG. 5 is a block diagram of a translation server of Embodiment 1.
Figure 6:
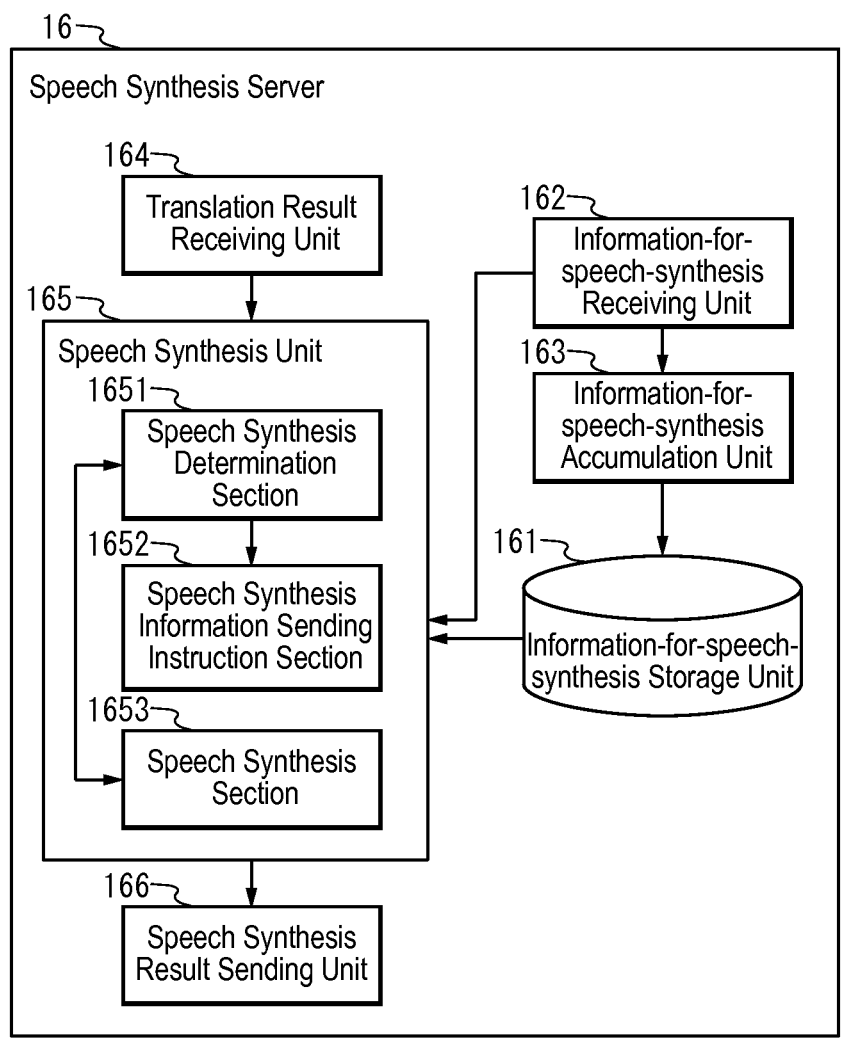
FIG. 6 is a block diagram of a speech synthesis server of Embodiment 1.
Figure 7:
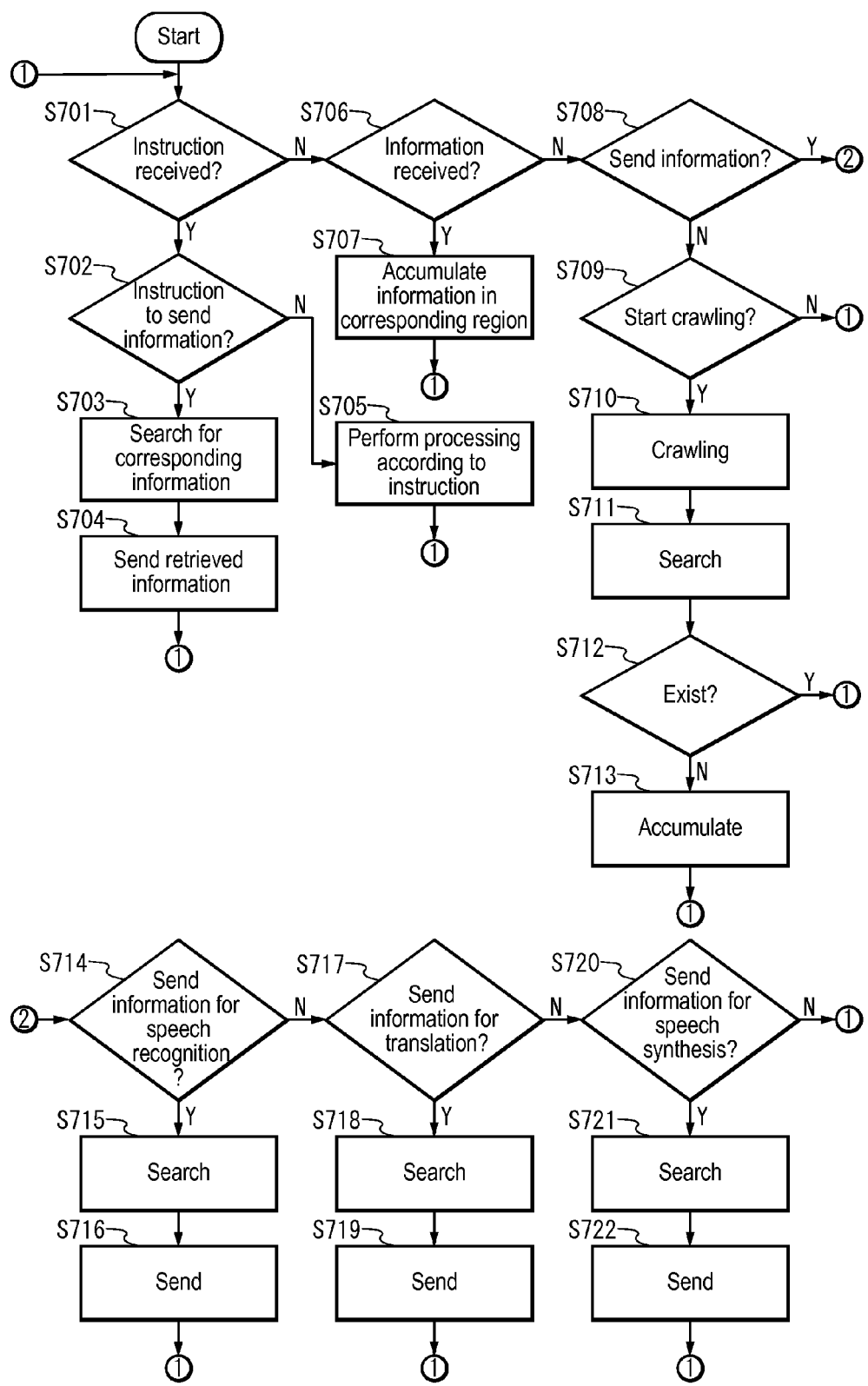
FIG. 7 is a flowchart illustrating an operation of the dictionary server of Embodiment 1.
Figure 8:
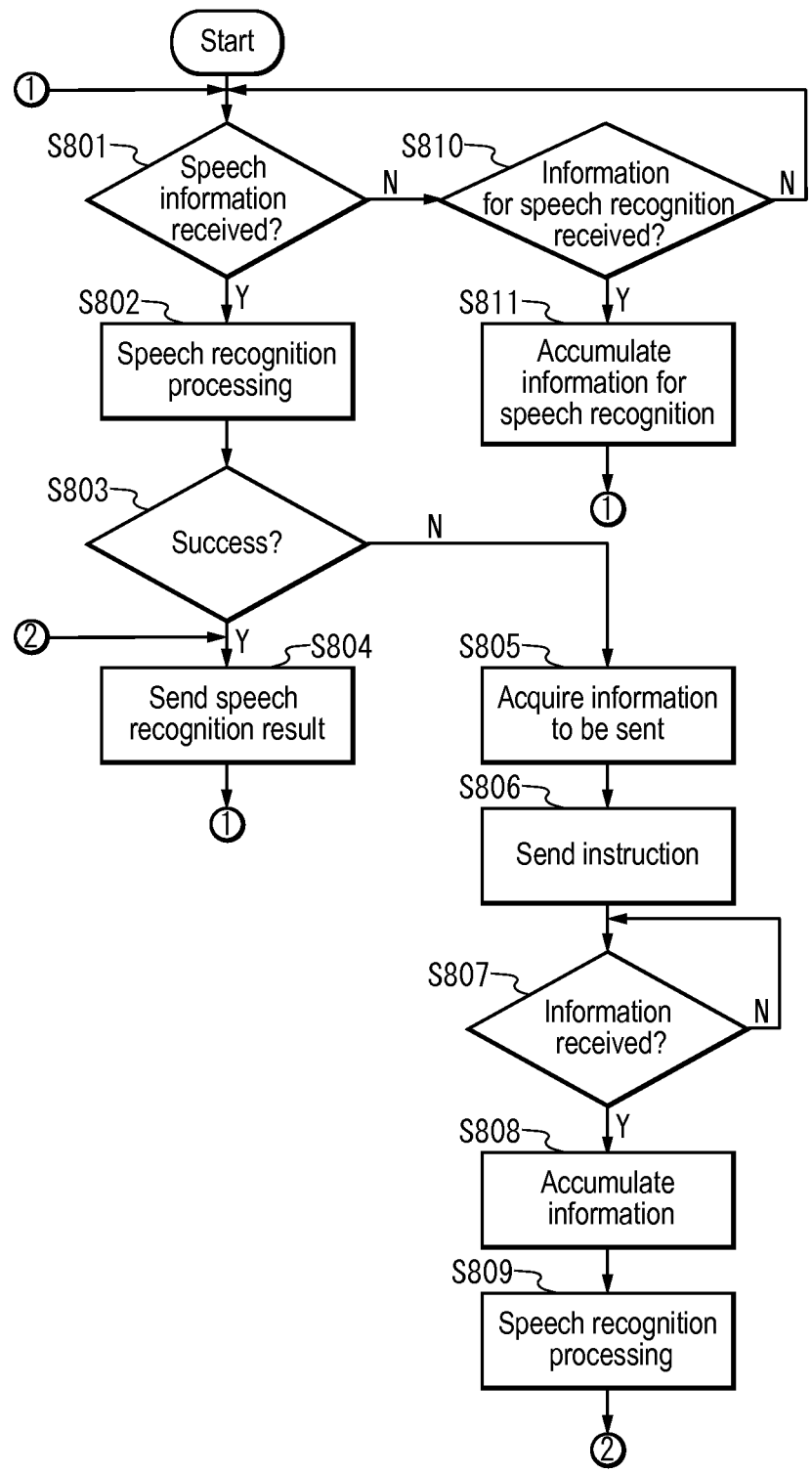
FIG. 8 is a flowchart illustrating an operation of the speech recognition server of Embodiment 1.
Figure 9:
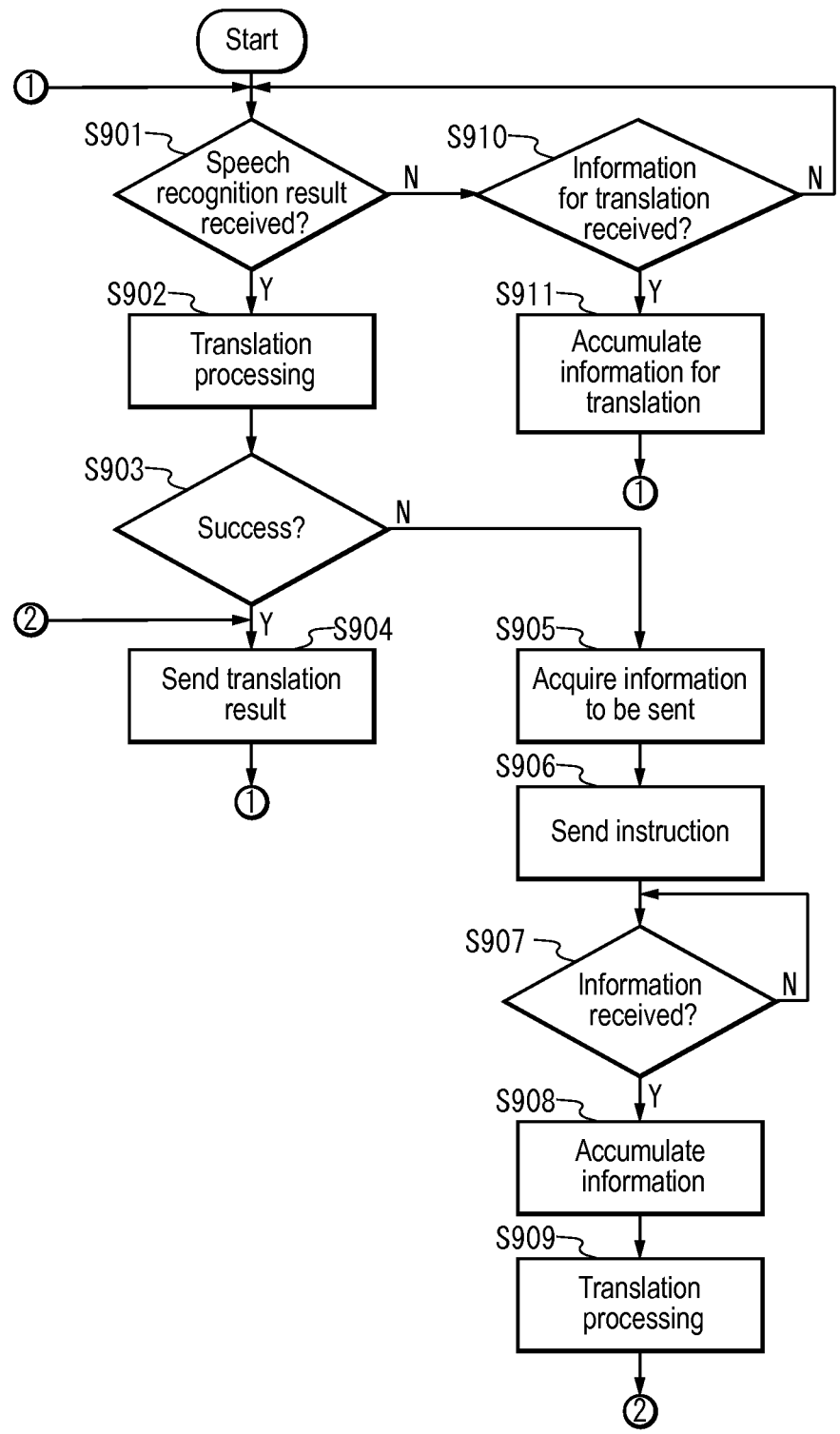
FIG. 9 is a flowchart illustrating an operation of the translation server of Embodiment 1.
Figure 10:
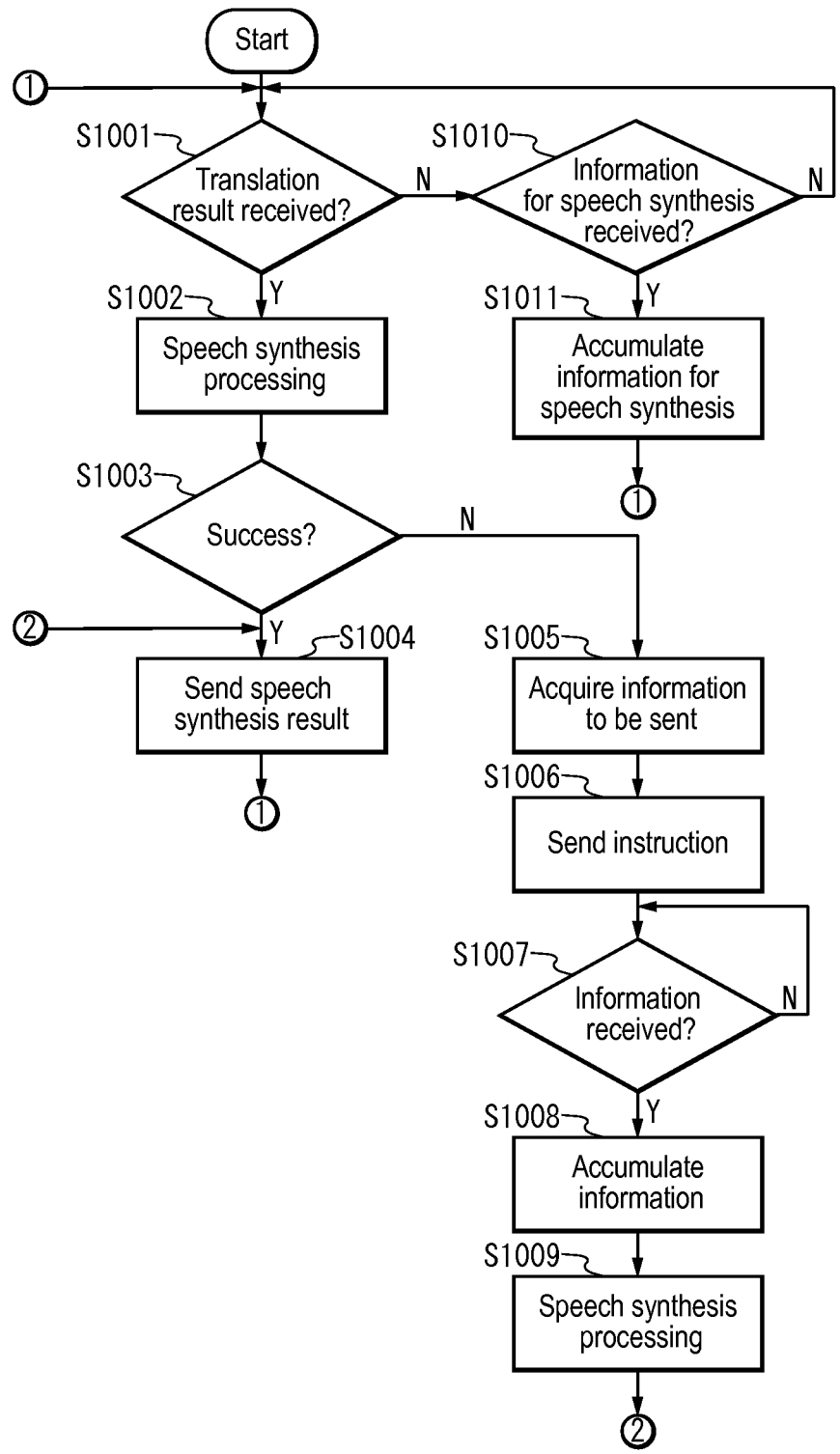
FIG. 10 is a flowchart illustrating an operation of the speech synthesis server of Embodiment 1.
Figure 18:
FIG. 18 shows an output example of Embodiment 1.
Figure 19:
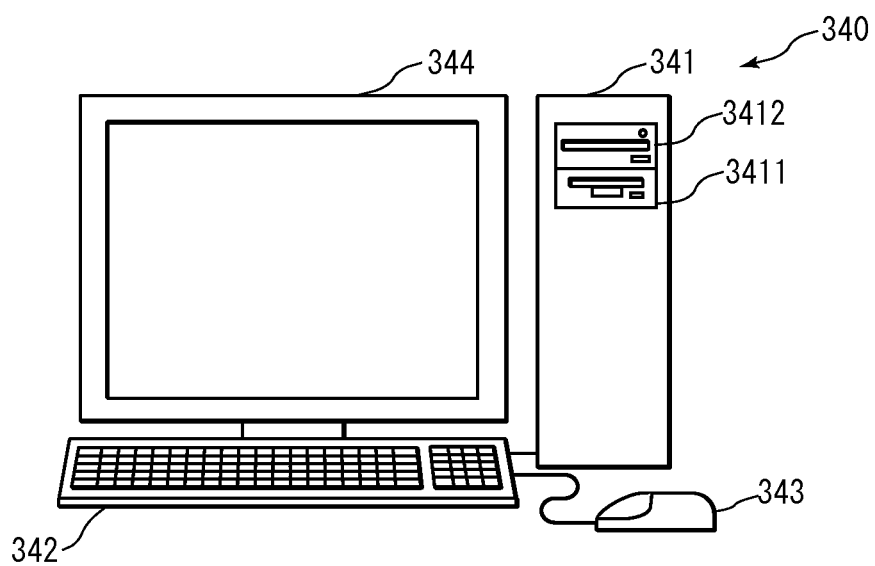
FIG. 19 is a schematic diagram of a computer system of Embodiment 1.
Figure 20:
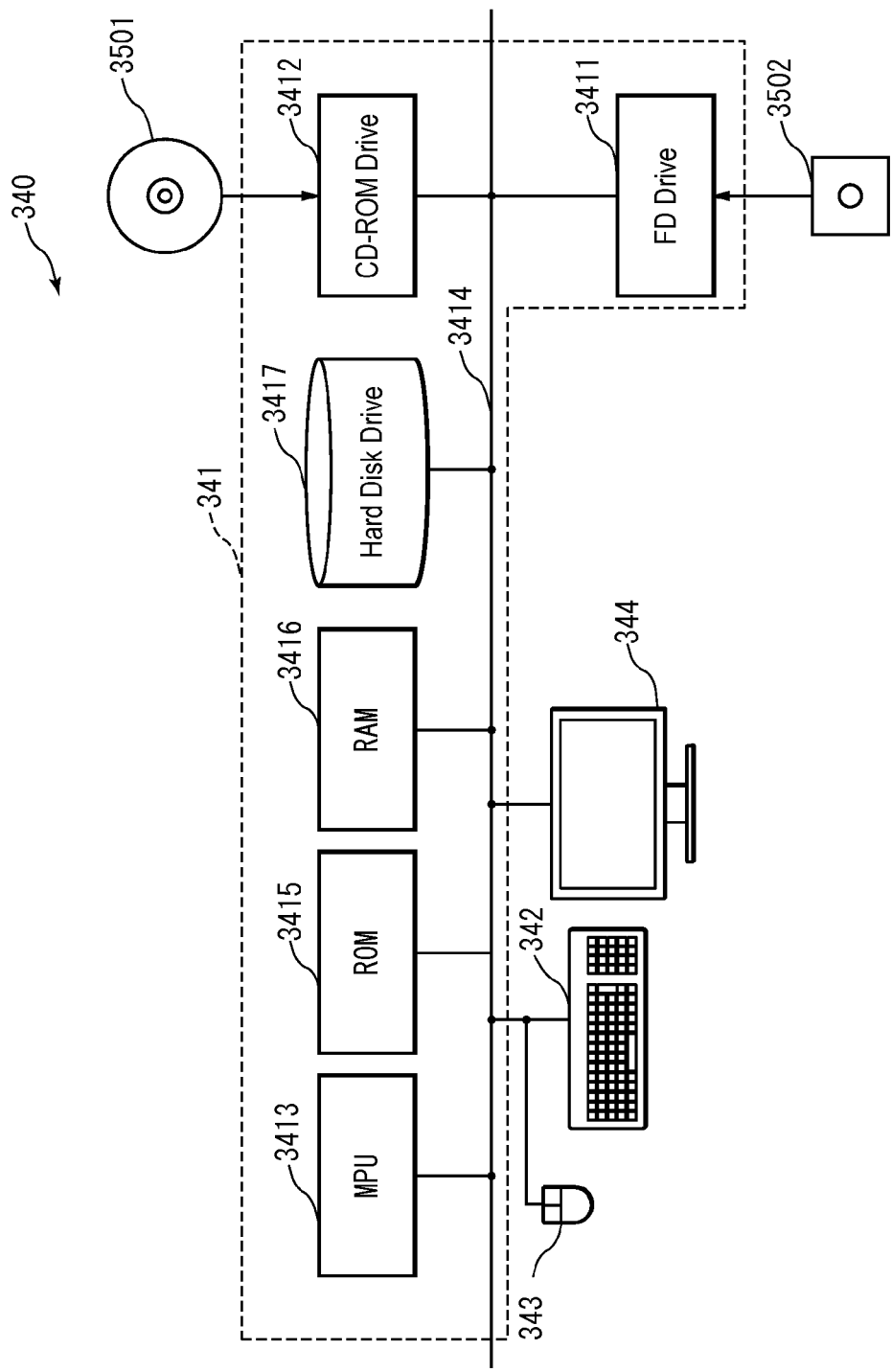
FIG. 20 is a block diagram of the computer system of Embodiment 1.

The invention claimed is:

1. A speech translation system comprising:
a dictionary server;
one or more speech recognition servers;
one or more translation servers; and
one or more speech synthesis servers;
wherein each speech recognition server comprises:
an information-for-speech-recognition storage unit capable of having stored therein information for speech recognition with respect to at least two of the two or more languages;
an information-for-speech-recognition receiving unit that receives, from the dictionary server, information for speech recognition with respect to at least two of the two or more languages;
an information-for-speech-recognition accumulation unit that accumulates the information for speech recognition received by the information-for-speech-recognition receiving unit in the information-for-speech-recognition storage unit;
a speech information receiving unit that receives speech information that is information of speech input to a first terminal apparatus;
a speech recognition unit that performs speech recognition on the speech information received by the speech information receiving unit by using information for speech recognition in the information-for-speech-recognition storage unit, and acquires a speech recognition result; and
a speech recognition result sending unit that sends the speech recognition result; wherein the speech recognition unit of the speech recognition server comprises:
a speech recognition determination section that determines whether speech recognition processing performed on the speech information received by the speech information receiving unit has succeeded or failed;
a speech recognition information sending instruction section that issues, to the dictionary server, an instruction to send speech recognition information in a case where the speech recognition determination section has determined that the speech recognition processing has failed; and
a speech recognition section that performs speech recognition on the speech information received by the speech information receiving unit by using information for speech recognition in the information-for-speech-recognition storage unit, and acquires a speech recognition result, and also performs speech recognition by using speech recognition information that the information-for-speech-recognition receiving unit has received from the dictionary server in response to sending of the instruction, and acquires a speech recognition result,
the information-for-speech-recognition receiving unit receives the speech recognition information from the dictionary server in response to sending of the instruction, and the information for speech recognition accumulation unit accumulates the speech recognition information received by the information for speech recognition receiving unit after sending the instruction in the information for speech recognition storage unit.

2. A speech recognition server according to claim 1.

3. A speech translation system comprising:
a dictionary server;
one or more speech recognition servers;
one or more translation servers; and
one or more speech synthesis servers;
wherein each translation server comprises:
an information-for-translation storage unit capable of having stored therein information for translation with respect to at least two of the two or more languages;
an information-for-translation receiving unit that receives, from the dictionary server, information for sound translation with respect to at least two of the two or more languages;
an information-for-translation accumulation unit that accumulates the information for translation received by the information-for-translation receiving unit in the information-for-translation storage unit;
a speech recognition result receiving unit that receives the speech recognition result;
a translation unit that translates the speech recognition result received by the speech recognition result receiving unit into a target language by using information for translation in the information-for-translation storage unit, and acquires a translation result; and
a translation result sending unit that sends the translation result,
wherein the translation unit of the translation server comprises:
a translation determination section that determines whether translation processing performed on the speech recognition result received by the speech recognition result receiving unit has succeeded or failed;
a translation information sending instruction section that issues, to the dictionary server, an instruction to send the written form of the term in the target language in a case where the translation determination section has determined that the translation processing has failed;
a translation section that translates the speech recognition result received by the speech recognition result receiving unit into the target language by using information for translation in the information-for-translation storage unit, and acquires a translation result, and also translates the speech recognition result into the target language by using the written form of the term in the target language that the information-for-translation receiving unit has received from the dictionary server in response to sending of the instruction, and acquires a translation result,
wherein the information-for-translation receiving unit receives the written form of the term in the target language from the dictionary server in response to sending of the instruction, and the information for translation accumulation unit accumulates the translation information received by the information for translation receiving unit after sending the instruction in the information for translation storage unit.

4. A translation server according to claim 3.

5. A speech translation system comprising:
a dictionary server;
one or more speech recognition servers;
one or more translation servers; and
one or more speech synthesis servers;
wherein each speech synthesis server comprises:
an information-for-speech-synthesis storage unit capable of having stored therein information for speech synthesis with respect to at least two of the two or more languages;
an information-for-speech-synthesis receiving unit that receives, from the dictionary server, information for speech synthesis with respect to at least two of the two or more languages;
an information-for-speech-synthesis accumulation unit that accumulates the information for speech synthesis received by the information-for-speech-synthesis receiving unit in the information-for-speech-synthesis storage unit;
a translation result receiving unit that receives the translation result;
a speech synthesis unit that performs speech synthesis on the translation result received by the translation result receiving unit by using information for speech synthesis in the information-for-speech-synthesis storage unit, and acquires a speech synthesis result; and
a speech synthesis result sending unit that sends the speech synthesis result to a second terminal apparatus;
wherein the speech synthesis unit of the speech synthesis server comprises:
a speech synthesis determination section that determines whether speech synthesis processing performed on the translation result received by the translation result receiving unit has succeeded or failed;
a speech synthesis information sending instruction section that issues, to the dictionary server, an instruction to send speech synthesis information in a case where the speech synthesis determination section has determined that the speech synthesis processing has failed; and
a speech synthesis section that performs speech synthesis on the translation result received by the translation result receiving unit by using information for speech synthesis in the information-for-speech-synthesis storage unit, and acquires a speech synthesis result, and also performs speech synthesis on the translation result by using the speech synthesis information that the information-for-speech-synthesis receiving unit has received from the dictionary server in response to sending of the instruction, and acquires a speech synthesis result, and
the information-for-speech-synthesis receiving unit receives the speech synthesis information from the dictionary server in response to sending of the instruction, and the information for speech synthesis accumulation unit accumulates the speech synthesis information received by the information for speech synthesis receiving unit after sending the instruction in the information for speech synthesis storage unit.

6. A speech synthesis server according to claim 5.

7. A computer comprising a storage medium and a software program,
wherein the software program causes the computer to function as:
an information-for-speech-recognition sending unit that acquires, from the storage medium, information for speech recognition that includes speech recognition information of the term with respect to all of the two or more languages, or at least two of the two or more languages, and sends the information for speech recognition to the one or more speech recognition servers;
an information-for-translation sending unit that acquires, from the storage medium, information for translation that includes the written form of the term with respect to all of the two or more languages, or at least two of the two or more languages, and sends the information for translation to the one or more translation servers;

an information-for-speech-synthesis sending unit that acquires, from the storage medium, information for speech synthesis that includes speech synthesis information of the term with respect to all of the two or more languages, or at least two of the two or more languages, and sends the information for speech synthesis to one or more speech synthesis servers and the information for speech synthesis accumulation unit accumulates the speech synthesis information received by the information for speech synthesis receiving unit after sending the instruction in the information for speech synthesis storage unit;

a written form acquiring unit that acquires a written form of a term that does not exist in the all-language group dictionary storage unit from web pages on one or more web servers on the Internet; and a written form accumulation unit that accumulates the written form of the term acquired by the written form acquiring unit in the all-language group dictionary storage unit.

8. A computer comprising a storage medium and a software program, wherein the software program causes the computer to function as:

an information-for-translation storage unit capable of having stored therein information for translation with respect to at least two of the two or more languages;

an information-for-translation receiving unit that acquires, from the storage medium, information for sound translation with respect to at least two of the two or more languages;

an information-for-translation accumulation unit that accumulates the information for translation received by the information-for-translation receiving unit in the information-for-translation storage unit;

a speech recognition result receiving unit that receives the speech recognition result;

a translation unit that translates the speech recognition result received by the speech recognition result receiving unit into a target language by using information for translation in the information-for-translation storage unit, and acquires a translation result; and a translation result sending unit that sends the translation result, wherein the translation unit of the translation server comprises:

a translation determination section that determines whether translation processing performed on the speech recognition result received by the speech recognition result receiving unit has succeeded or failed;

a translation information sending instruction section that issues, to the storage medium, an instruction to send the written form of the term in the target language in a case where the translation determination section has determined that the translation processing has failed;

a translation section that translates the speech recognition result received by the speech recognition result receiving unit into the target language by using information for translation in the information-for-translation storage unit, and acquires a translation result, and also translates the speech recognition result into the target language by using the written form of the term in the target language that the information-for-translation receiving unit has acquired from the storage medium in response to sending of the instruction, and acquires a translation result, wherein the information-for-translation receiving unit acquires the written form of the term in the target language from the storage medium in response to sending of the instruction, and the information for translation accumulation unit accumulates the translation information received by the information for translation receiving unit after sending the instruction in the information for translation storage unit.

9. A computer comprising a storage medium and a software program, wherein the software program causes the computer to function as:

an information-for-speech-synthesis storage unit capable of having stored therein information for speech synthesis with respect to at least two of the two or more languages;

an information-for-speech-synthesis receiving unit that acquires, from the storage medium, information for speech synthesis with respect to at least two of the two or more languages;

an information-for-speech-synthesis accumulation unit that accumulates the information for speech synthesis received by the information-for-speech-synthesis receiving unit in the information-for-speech-synthesis storage unit;

a translation result receiving unit that receives the translation result;

a speech synthesis unit that performs speech synthesis on the translation result received by the translation result receiving unit by using information for speech synthesis in the information-for-speech-synthesis storage unit, and acquires a speech synthesis result; and a speech synthesis result sending unit that sends the speech synthesis result to a second terminal apparatus;

wherein the speech synthesis unit of the speech synthesis server comprises:

a speech synthesis determination section that determines whether speech synthesis processing performed on the translation result received by the translation result receiving unit has succeeded or failed;

a speech synthesis information sending instruction section that issues, to the storage medium, an instruction to send speech synthesis information in a case where the speech synthesis determination section has determined that the speech synthesis processing has failed; and a speech synthesis section that performs speech synthesis on the translation result received by the translation result receiving unit by using information for speech synthesis in the information-for-speech-synthesis storage unit, and acquires a speech synthesis result, and also performs speech synthesis on the translation result by using the speech synthesis information that the information-for-speech-synthesis receiving unit has acquired from the storage medium in response to sending of the instruction, and acquires a speech synthesis result, and the information-for-speech-synthesis receiving unit acquires the speech synthesis information from the storage medium in response to sending of the instruction, and the information for speech synthesis accumulation unit accumulates the speech synthesis information received by the information for speech synthesis receiving unit after sending the instruction in the information for speech synthesis storage unit.

\* \* \* \* \*